United States Patent [19]
Chida

[11] Patent Number: 5,640,195
[45] Date of Patent: Jun. 17, 1997

[54] MULTIMEDIA COMMUNICATION SYSTEM, MULTIMEDIA INFORMATION TRANSMITTING APPARATUS AND MULTIMEDIA INFORMATION RECEIVING APPARATUS

[75] Inventor: Makoto Chida, Kawasaki, Japan

[73] Assignee: Canon Kabushiki Kaisha, Tokyo, Japan

[21] Appl. No.: 199,659

[22] Filed: Feb. 22, 1994

[30] Foreign Application Priority Data

Feb. 19, 1993 [JP] Japan ................................. 5-055131
Feb. 17, 1994 [JP] Japan ................................. 6-043235

[51] Int. Cl.⁶ .................................................. H04N 7/14
[52] U.S. Cl. ............................ 348/13; 348/14; 348/16
[58] Field of Search .......................... 348/13, 14, 15, 348/16, 17; 358/84; 379/53, 54, 102, 104, 105; H04N 7/14, 7/15

[56] References Cited

U.S. PATENT DOCUMENTS

| 4,771,283 | 9/1988 | Imoto ............................ 340/825.71 |
| 4,907,079 | 3/1990 | Turner et al. ....................... 358/84 |
| 5,027,400 | 6/1991 | Baji et al. ............................ 348/10 |
| 5,086,385 | 2/1992 | Launey et al. ..................... 364/188 |
| 5,357,276 | 10/1994 | Banker et al. ......................... 348/7 |
| 5,396,546 | 3/1995 | Remillard ............................. 348/13 |
| 5,410,343 | 4/1995 | Coddington et al. ............... 379/105 |
| 5,412,418 | 5/1995 | Nishimura et al. .................. 348/14 |
| 5,412,708 | 5/1995 | Katz .................................... 379/104 |
| 5,414,457 | 5/1995 | Kadowaki et al. ................... 348/14 |
| 5,418,560 | 5/1995 | Yasuda ................................. 348/14 |
| 5,444,476 | 8/1995 | Conway ............................... 348/16 |

FOREIGN PATENT DOCUMENTS 0314177 5/1989 European Pat. Off. .
0390041 10/1990 European Pat. Off. .

Primary Examiner—John K. Peng
Assistant Examiner—Chris Grant
Attorney, Agent, or Firm—Fitzpatrick, Cella, Harper & Scinto

[57] ABSTRACT

A multimedia communication apparatus enabling remote control, by generating operation guidance information for operating this apparatus, transmitting thus generated operation guidance information to a partner apparatus, then receiving and recognizing information on operation from the partner apparatus in response to the operation guidance information, and effecting an operation according to thus recognized information on operation.

19 Claims, 28 Drawing Sheets

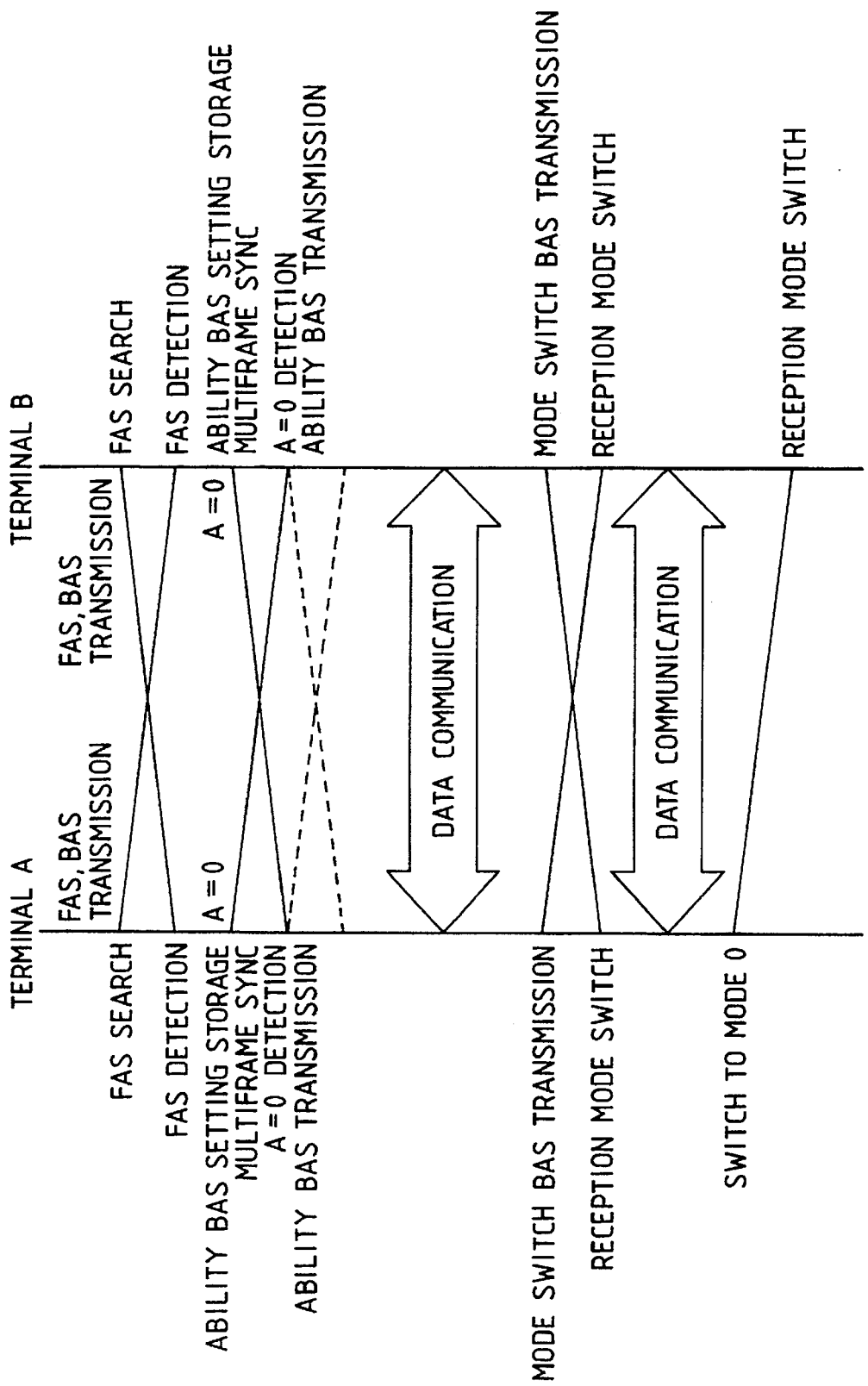

FIG. 5A

| FRAME \ BIT NUMBER OF SERVICE CHANNEL IN EACH FRAME | 1 | 2 | 3 | 4 | 5 | 6 | 7 | 8 |
|---|---|---|---|---|---|---|---|---|
| EVEN-NUMBER FRAME | $X_{EVEN}$ | 0 | 0 | 1 | 1 | 0 | 1 | 1 |
| ODD-NUMBER FRAME | $X_{odd}$ | 1 | A | E | $C_1$ | $C_2$ | $C_3$ | $C_4$ |

FIG. 5B

| FRANE NUMBER | 1 | 3 | 5 | 7 | 9 | 11 | 13 | 15 |
|---|---|---|---|---|---|---|---|---|
| $X_{odd}$ | $N_1$ | $N_2$ | $N_3$ | $N_4$ | $N_5$ | $R_1$ | $R_2$ | TEA |

FIG. 5C

| FRANE NUMBER | 0 | 2 | 4 | 6 | 8 | 10 | 12 | 14 |
|---|---|---|---|---|---|---|---|---|
| $X_{EVEN}$ | 0 | 0 | 1 | 0 | 1 | 1 | $R_3$ | $R_4$ |

FIG. 6A

| BIT NUMBER | $b_0$ | $b_1$ | $b_2$ | $b_3$ | $b_4$ | $b_5$ | $b_6$ | $b_7$ |
|---|---|---|---|---|---|---|---|---|
| BAS CONTENTS | ATTRIBUTION ||| ATTRIBUTION VALUE |||||

FIG. 6B

| $b_0$ | $b_1$ | $b_2$ | COMMAND OR ABILITY |
|---|---|---|---|
| 0 | 0 | 0 | AUDIO ENCODE COMMAND |
| 0 | 0 | 1 | TRANSFER RATE COMMAND |
| 0 | 1 | 0 | VIDEO AND OTHER COMMANDS |
| 0 | 1 | 1 | DATA COMMAND |
| 1 | 0 | 0 | TERMINAL ABILITY 1 |
| 1 | 0 | 1 | TERMINAL ABILITY 2 |
| 1 | 1 | 0 | UNDEFINED |
| 1 | 1 | 1 | ESCAPE CODE |

FIG. 7

| PUSH BUTTON DIAL SIGNAL | FREQUENCY (Hz) | |
|---|---|---|
| | LOW GROUP | HIGH GROUP |
| 1 | 697 | 1209 |
| 2 | 697 | 1336 |
| 3 | 697 | 1477 |
| 4 | 770 | 1209 |
| 5 | 770 | 1336 |
| 6 | 770 | 1477 |
| 7 | 825 | 1209 |
| 8 | 825 | 1336 |
| 9 | 825 | 1477 |
| * | 941 | 1209 |
| 0 | 941 | 1336 |
| # | 941 | 1477 |

FIG. 8A

MOUSE OPERATION

| IDENTIFIER | TYPE DESIGNATION | KEY CONTROL INFORMATION | POINTING INFORMATION |
|---|---|---|---|

FIG. 8B

KEY OPERATION

| IDENTIFIER | TYPE DESIGNATION | KEY CONTROL INFORMATION (STATE OF KEY NUMBER) |
|---|---|---|

FIG. 8C

PEN INPUT OPERATION (MOUSE INPUT)

| IDENTIFIER | TYPE DESIGNATION | KEY CONTROL INFORMATION | POINTING CONTROL INFORMATION (X, Y COORDINATES, ON/OFF) |
|---|---|---|---|

FIG. 8D

OPERATION ABILITY

| IDENTIFIER | TYPE CLASSIFICATION | AUXILIARY INFORMATION |
|---|---|---|

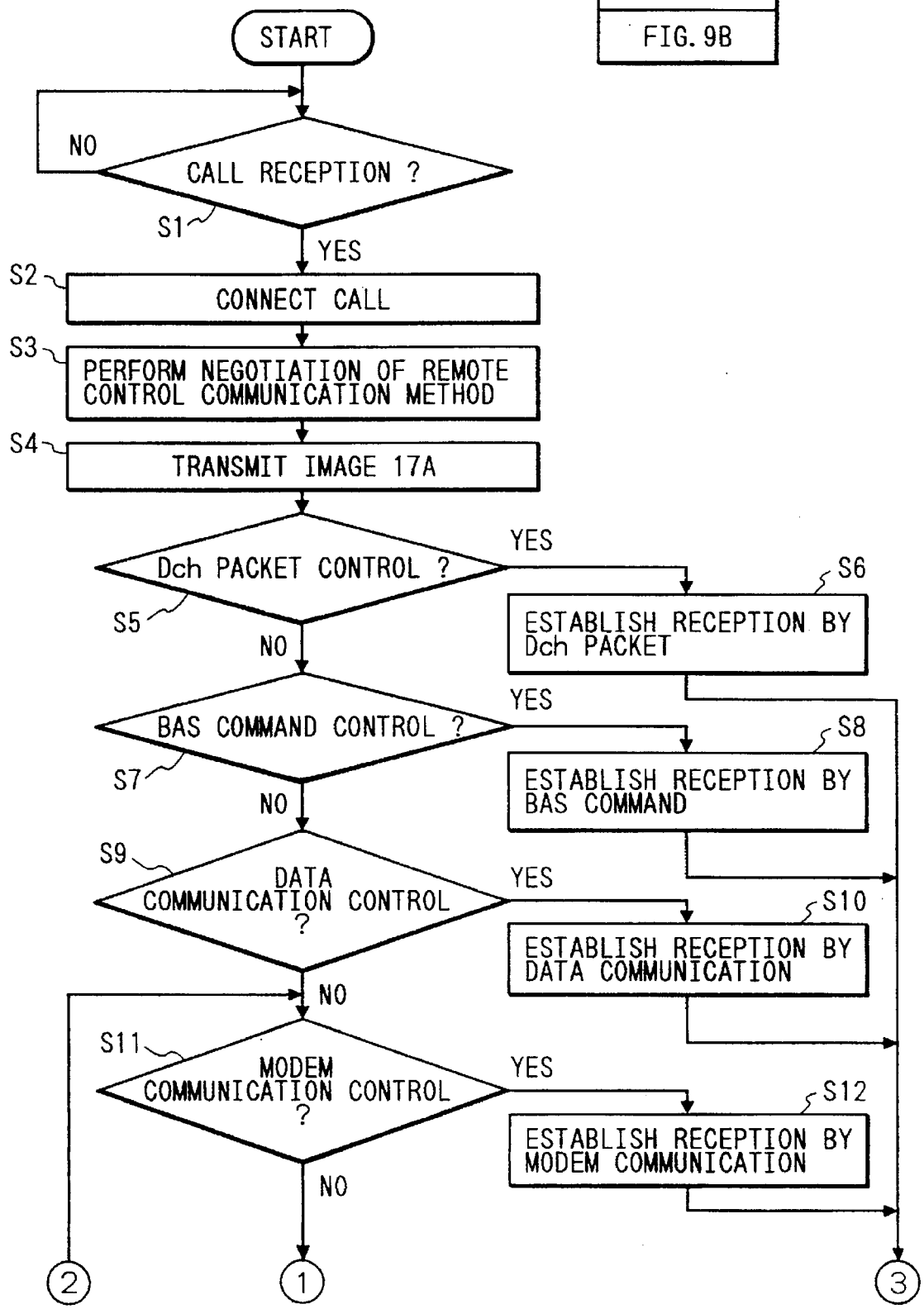

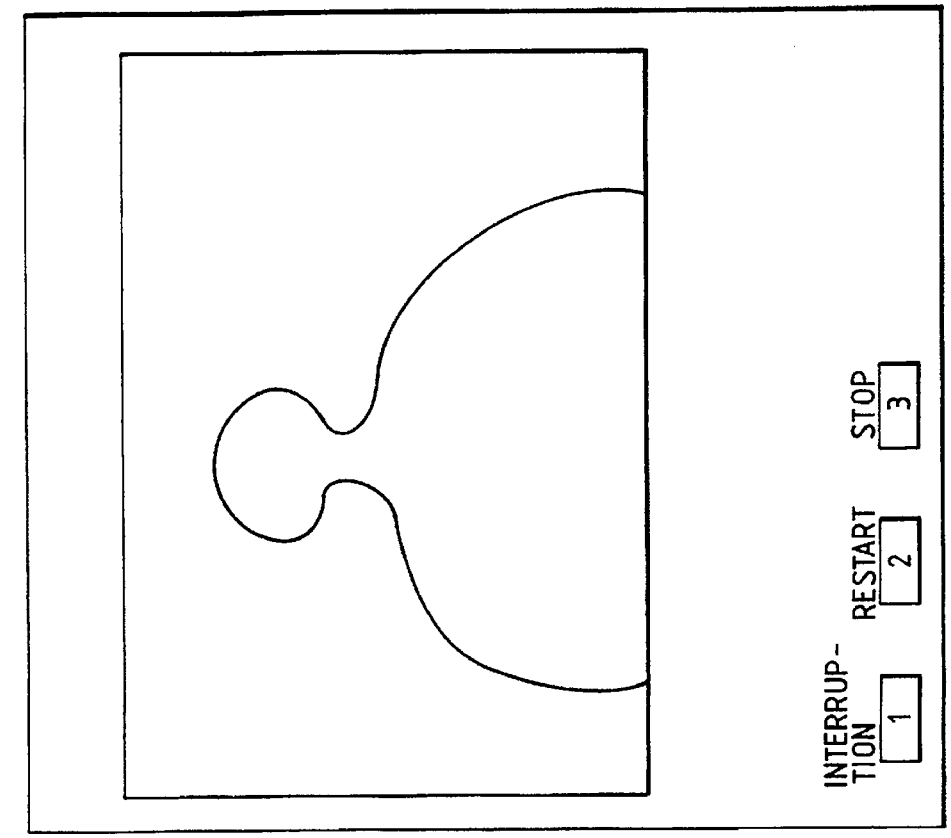

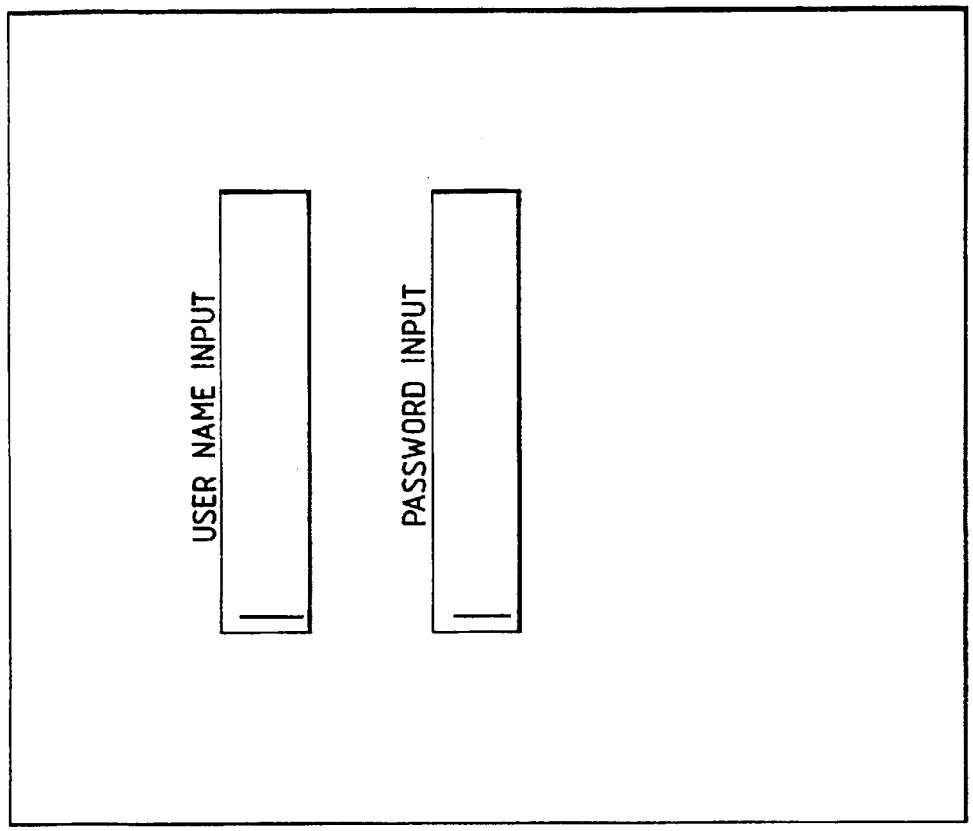
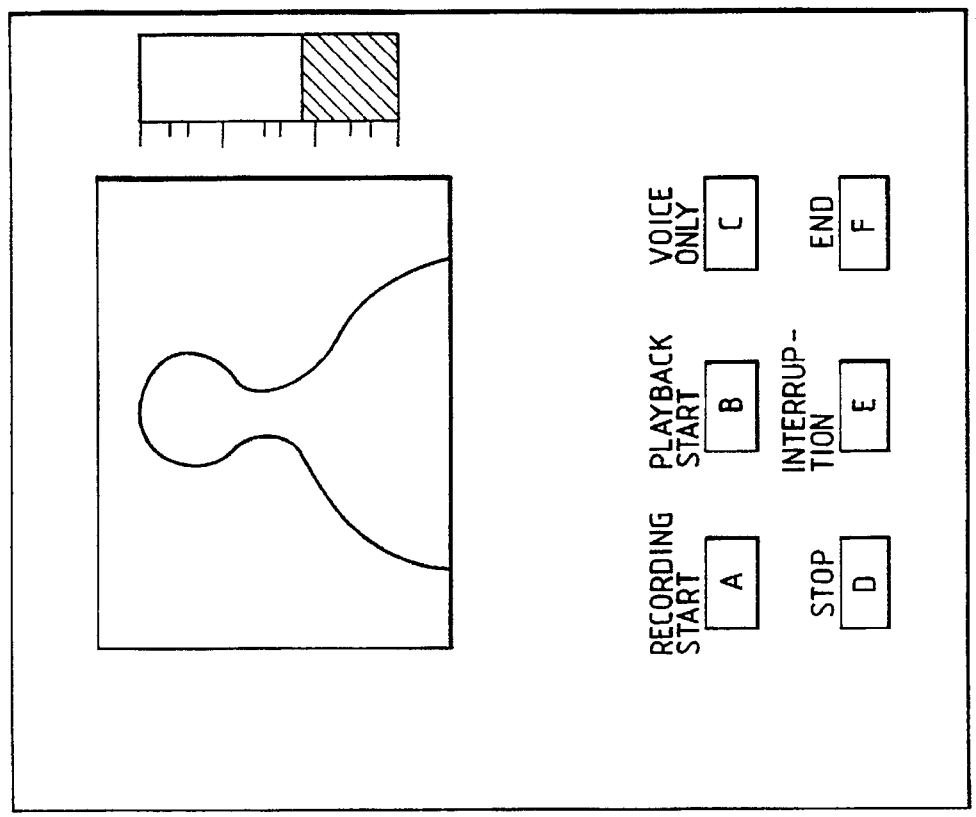

FIG. 17P

ABSENCE RECORDING LIST

| TEL NUMBER | TIME | RECORDING TIME |
|---|---|---|
|  |  |  |
|  |  |  |
|  |  |  |

| END | MENU | PLAYBACK | INDEX PLAYBACK |
|---|---|---|---|

MOVE ---- ARROW KEY
STROKE ---- STROKE KEY
DELETE ---- [DEL] KEY
START ---- [S] KEY
STOP ---- [Q] KEY
ASCERTAINMENT ---- RETURN KEY

FIG. 17O

MESSAGE LIST

| MESSAGE NAME | PARTNER'S NUMBER |
|---|---|
|  |  |
|  |  |
|  |  |

ASCERTAINMENT ---- RETURN KEY
MOVE ---- ARROW KEY
STROKE ---- STROKE KEY
DELETE ---- [DEL] KEY
INSERT ---- [INS] KEY
MENU ---- [ESC] KEY
START ---- [S] KEY
STOP ---- [Q] KEY

FIG. 17V

ABSENCE RECORDING LIST

| FILE | EDITING | PLAYBACK | END |
|------|---------|----------|-----|
| TELEPHONE NUMBER | | TIME | RECORD-ING TIME |
| | | | |
| | | | |
| | | | |
| | | | |
| | | | |
| | | | |

FIG. 17U

MESSAGE LIST

| FILE | EDITING | RECORD-ING | PLAY-BACK | END |
|------|---------|------------|-----------|-----|
| MESSAGE NAME | | | PARTNER'S NUMBER | |
| | | | | |
| | | | | |
| | | | | |
| | | | | |
| | | | | |

MULTIMEDIA COMMUNICATION SYSTEM, MULTIMEDIA INFORMATION TRANSMITTING APPARATUS AND MULTIMEDIA INFORMATION RECEIVING APPARATUS

BACKGROUND OF THE INVENTION

1. Field of the Invention

The present invention relates to a multimedia communication apparatus capable of remote control in transmitting and receiving image and audio information.

2. Related Background Art

The conventional analog telephone line can only transmit voice information in the telephone communication, and data transmission can only be made at a low speed.

However, with the recent advancement in the fields of communication, semiconductor and optical communication, digital communication lines have been developed and have enabled the high-speed transmission of data of a large amount.

The digital transmission, being featured by that the quality of data can be maintained at a same level without loss in the course of transmission and that various media can be unified as a data transmission channel matching the characteristics of media is not required, and has thus realized transmission between complex media terminals. Thus, instead of the conventional telephone for transmission of voice only, there has been developed a multimedia communication apparatus capable of also transmitting the image at the same time.

The audio data to be transmitted have various formats, such as 64 Kbps (μ-law, A-law), 64 Kbps/56 Kbps/48 Kbps (SB-ADPCM), 32 Kbps (AD-PCM), 16 Kbps, 8 Kbps etc.

Also the transmission of image data by the digital line is made possible by data amount reduction through various band compressions such as movement compensation, frame skipping, inter- and intra-frame compensation, DCT transformation, vector quantizing transformation etc. An image encoding method, acceptable for the transfer rate of 64 Kbps which is the basic interface for the ISDN network, is the H.261 according to the ITU-T (formerly CCITT) recommendation.

For enabling mutual communication between the terminals dealing with such audio and image data, international standardization is being promoted by ITU-T (formerly CCITT) etc., and the rules for the service, protocol and multimedia multiplex frame configuration for audio visual services such as TV telephone or TV conference utilizing digital channel have been published as ITU-T (formerly CCITT) recommendations H.320, H.242, H.221 etc.

The recommendation H.221 defines the frame structure in the audio visual services from 64 to 192 Kbps, and the code allocation of FAS (frame alignment signal) and BAS (bitrate allocation signal) in the terminal ability exchange mode or in the communication mode.

Also H.242 defines the protocols for the ability exchange, communication mode switching etc. between the AV terminals employing BAS, and H.320 defines the system aspect of the AV services in general.

These recommendations define the method of multimedia communication for image, voice and data, after the setting of end-to-end physical connection and the establishment of synchronization by in-channel FAS, by means of the in-channel terminal ability exchange sequence utilizing BAS, mode switching sequence by designation of the communication mode etc.

However, adjustment of the terminal ability in each terminal according to the situation or selection of the communication mode within the exchanged ability is not contained in the definitions.

The information transfer rate of the media in the multimedia communication is determined, for the voice information, by the designation of the voice encoding method, while that for the data information is determined by presence or absence of data information and the designated transfer rate thereof in case the data information is present, and the transfer rate for image information is defined by the remainder after subtracting the transfer rates for the voice information and the data information from the entire information transfer rate of the selected communication channel.

However, the above-explained conventional multimedia communication apparatus, such as the television telephone apparatus capable of multimedia communication, in case of automatic call reception in the absence of the receiving person, can only effect a unilateral and fixed operation of transmitting a message indicating the absence of the receiver by a pre-recorded image or voice and recording and reproducing a message automatically received from the calling terminal, through the message telephone function. For operating such multimedia communication apparatus capable of automatic call reception from the calling apparatus, both the transmitting and receiving sides have to recognize and execute a particular command, so that such command will become a particular function to these specified terminals. Consequently, it has not been possible to achieve remote control from other ordinary multimedia communication apparatus.

SUMMARY OF THE INVENTION

In consideration of the foregoing, an object of the present invention is to provide a multimedia communication apparatus that can be remote controlled from another multimedia communication apparatus.

Another object of the present invention is to provide a multimedia communication apparatus that can be remote controlled from various multimedia communication apparatus.

The above-mentioned objects can be attained according to a preferred embodiment of the present invention, by a multimedia communication system for effecting communication between a first communication apparatus and a second communication apparatus;

wherein said first communication apparatus includes:
generation means for generating operation guidance information for operating said first communication apparatus from said second communication apparatus;
encoding means for encoding the operation guidance information generated by said generation means; and
transmission means for transmitting sad encoded operation guidance information to said second communication apparatus; and said second communication apparatus includes:
reception means for receiving said operation guidance information;
decoding means for decoding said received operation guidance information; and
display means for displaying said operation guidance information on a monitor.

Still another object of the present invention is to provide a multimedia communication apparatus capable of communicating desired remote control guidance according to the kind of the multimedia communication apparatus to become partner in communication.

Still another object of the present invention is to provide a multimedia communication apparatus having a novel function.

Still other objects of the present invention, and the features thereof, will become fully apparent from the following description, which is to be taken in conjunction with the attached drawings.

BRIEF DESCRIPTION OF THE DRAWINGS

FIG. 3 is a view showing in-channel control of a channel B;

FIGS. 5A to 5C are views showing the FAS bit structure;

FIGS. 6A and 6B are views showing the BAS bit structure;

FIG. 7 is a view showing the data content of a DTMF sound table;

FIGS. 8A to 8D are views showing data formats in an embodiment of the present invention, in the exchange of the operation ability between terminals and for the operation input for respective kinds;

DESCRIPTION OF THE PREFERRED EMBODIMENTS

Now the present invention will be clarified in detail by an embodiment thereof, with reference to the attached drawings.

Figure 1:
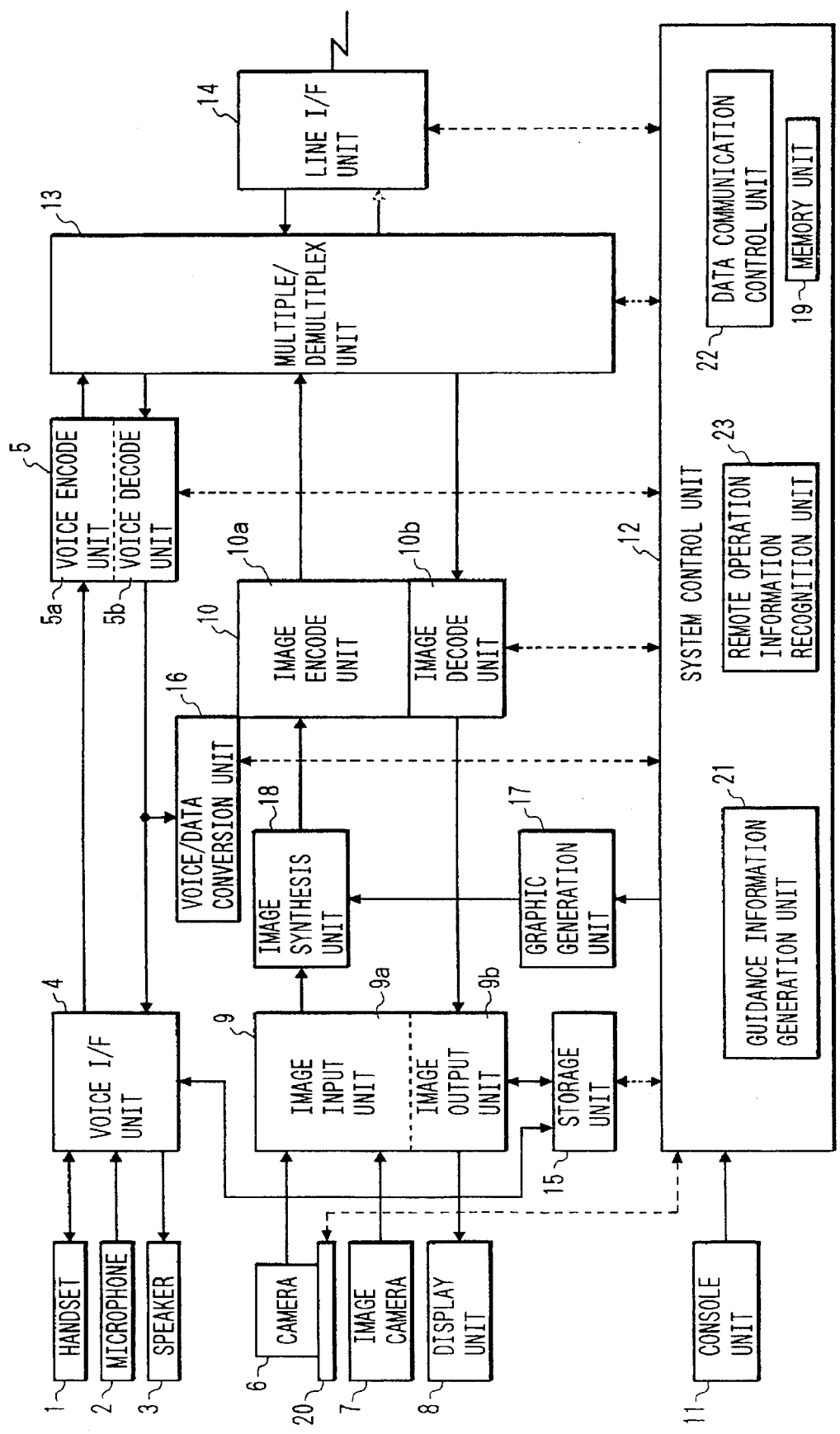
FIG. 1 is a schematic block diagram of a multimedia communication apparatus, constituting an embodiment of the present invention.

FIG. 1 is a schematic block diagram of a multimedia telephone apparatus constituting an embodiment of the present invention, wherein a system control unit 12 is provided with a CPU, a ROM, a RAM, a text VRAM, an auxiliary memory, a character generator (CG), an image signal generating circuit etc., and controls the entire apparatus by inspecting the status of various units, effecting operations matching the status, preparing the display image and executing an application program, according to a program preset in the ROM. The system control unit 12 is provided with a memory unit 19 to be explained later, and is connected to an operation (console) unit 11 such as a keyboard or a touch panel, for entering control information for controlling the present multimedia communication apparatus.

As voice input/output means there are provided a handset 1, a microphone 2 and a loud speaker 3, which are connected to a voice interface unit 4. Under the control of the system control unit 12, the voice interface unit 4 effects switching of the handset 1, microphone 2 and speaker 3, gain control for voice level adjustment, detection of on-hook/off-hook state of the handset 1, echo cancellation when the microphone 2 and the speaker 3 are used simultaneously, and generation of various tones such as dialling tone, call tone, busy tone, call reception tone etc. Though not illustrated, the handset 1 is provided, on the rear side thereof, with dialling push-buttons PB. The voice interface unit 4 is connected to a voice encode/decode unit 5, consisting of a voice encoding unit 5a and a voice decoding unit 5b and effecting, under the instruction from the system control unit 12, A/D conversion and encoding of the transmission voice signal according to a voice encode/decode algorithm such as 64 KbpsPCM (A-law), 64 KbpsPCM (μ-law), 7 kHz audio (SB-ADPCM), 32 KbpsADPCM, 16 Kbps (LD-CELP) or 8 Kbps, or decoding and D/A conversion of the received voice signal.

As image input/output means there are provided a camera 6 for entering for example the image of a person, an image camera 7 for entering a picture or a drawing, and a display unit 8 for displaying the image entered from these cameras, the image received from another terminal or the image supplied from the system control unit 12, and these image input/output means are connected to an image input/output unit 9.

The image input/output unit 9 consists of an image input unit 9a and an image output unit 9b, and effects, under the instruction from the system control unit 12, switching of the cameras 6, 7, display switching/division, signal transformation for image signal matching.

The camera 6 is rendered movable horizontally and vertically, by a camera support 20 which is controlled by the system control unit 12.

The above-mentioned image input/output unit 9 is connected to an image encode/decode unit 10 which consists of an image encoding unit 10a and an image decoding unit 10b and which effects encoding of the image to be transmitted, decoding of the received image, and reduces the image data of a large amount to a smaller amount transmittable through the digital line by band compression through various methods such as movement compensation, frame skipping, interframe compensation, DCT (discrete cosine transformation), vector quantizing transformation etc. The current basic interface for the ISDN channel has a transfer rate of 64 Kbps, and the ITU-T (formerly CCITT) recommendation H.261 provides the image encoding method enabling transmission at this transfer rate.

The above-mentioned voice encode/decode unit 5 and image encode/decode unit 10 are connected to a multiplex/demultiplex unit 13, which effects multiplexing of the voice data from the voice encode/decode unit 5, the image data from the image encode/decode unit 10 and the BAS from the system control unit 12 in the unit of a transmission frame, and demultiplexing (separation) of the received frame into constituting media (voice information, image information etc.) for supply to respectively corresponding media units. For such multiplexing and demultiplexing, there is already issued the ITU-T (formerly CCITT) recommendation H.221.

The multiplex/demultiplexing unit 13 is connected to a line interface unit 14 for effecting line control according to the ISDN user network interface, and effects multiplexing and demultiplexing on the above-mentioned data to be transmitted through such ISDN line.

A storage unit 15 stores data from the line interface unit 14 and the image input/output unit 9, and the image data stored in the storage unit 15 can be read and reproduced, when required, under the control of the system control unit 12. Consequently, when the data received by the line interface unit 14 are to be continuously displayed on the display unit 8, it is not necessary to continue the data reception through the line and unnecessary occupation of the communication line can be avoided.

A voice data conversion unit 16 detects the DTMF tones in the voice data decoded by the voice decoding unit 5b from the received voice data and converts the actuated push-buttons PB, recognized from the detected DTMF tones into data, or converts data, demodulated by a modem from the voice data, into remote control data.

The voice data conversion unit 16 is provided with a DTMF tone table as shown in FIG. 7, in order to detect the DTMF tones, for the purpose of conversion of the DTMF tones into the data of the actuated push-buttons PB.

A graphic generation unit 17 is provided for generating graphic data colored based on a bit map generated by the character generator in the system control unit 12, and said graphic data are utilized as operation guidance information for remote control of the present apparatus.

An image synthesis unit 18 effects synthesis of image data entered from the cameras 6, 7 or those entered in advance from said cameras 6, 7 and stored in the storage unit 15 and image data released from the graphic generation unit 17, and also transfer control in the transfer of thus synthesized data to the image encoding unit 10a. The image data synthesized in the transfer control by the image synthesis unit 18 are transmittal, as image data containing the operation guidance information for remote control of the present apparatus, to the partner apparatus.

The memory unit 19 in the system control unit 12 is provided for storing the format of the image to be transmitted, for transfer to the graphic data generation unit 17, a list of automatically recorded messages, passnumbers etc.

A guidance information generation unit 21 generates guidance information, which is to be transmitted from this terminal to the partner terminal for enabling said partner terminal to remote control this terminal. The guidance information generation unit 21 executes, for example, a process of reading attribution information, e.g., character information such as "Receiver is out of the office" together with color information indicating the display color end location information indicating the display position from the text VRAM in the form of code information and converting thus read information into the bit map by the character generator.

A data communication control unit 22 executes data communication by Dch, Sch packet exchange or Bch line exchange, or executes the data communication protocol by HSD (high speed data) or LSD (low speed data) according to the recommendation H.221, thereby controlling the data communication with the partner terminal.

A remote operation information recognition unit 23 receives and recognizes remote operation information transmitted from the partner terminal in response to the above-mentioned guidance information.

The transmitted information may assume various forms such as data of Bch or Dch data communication, audio DTMF tones, dialling pulses, modem modulated data, key data from a keyboard or pointing data for example of a mouse, but such data are decoded as operation information for remote control matching the for of such data.

In the following there will be explained the method of negotiating or varying the terminal ability in the present embodiment, with reference to FIGS. 2 to 6B.

Figure 2:
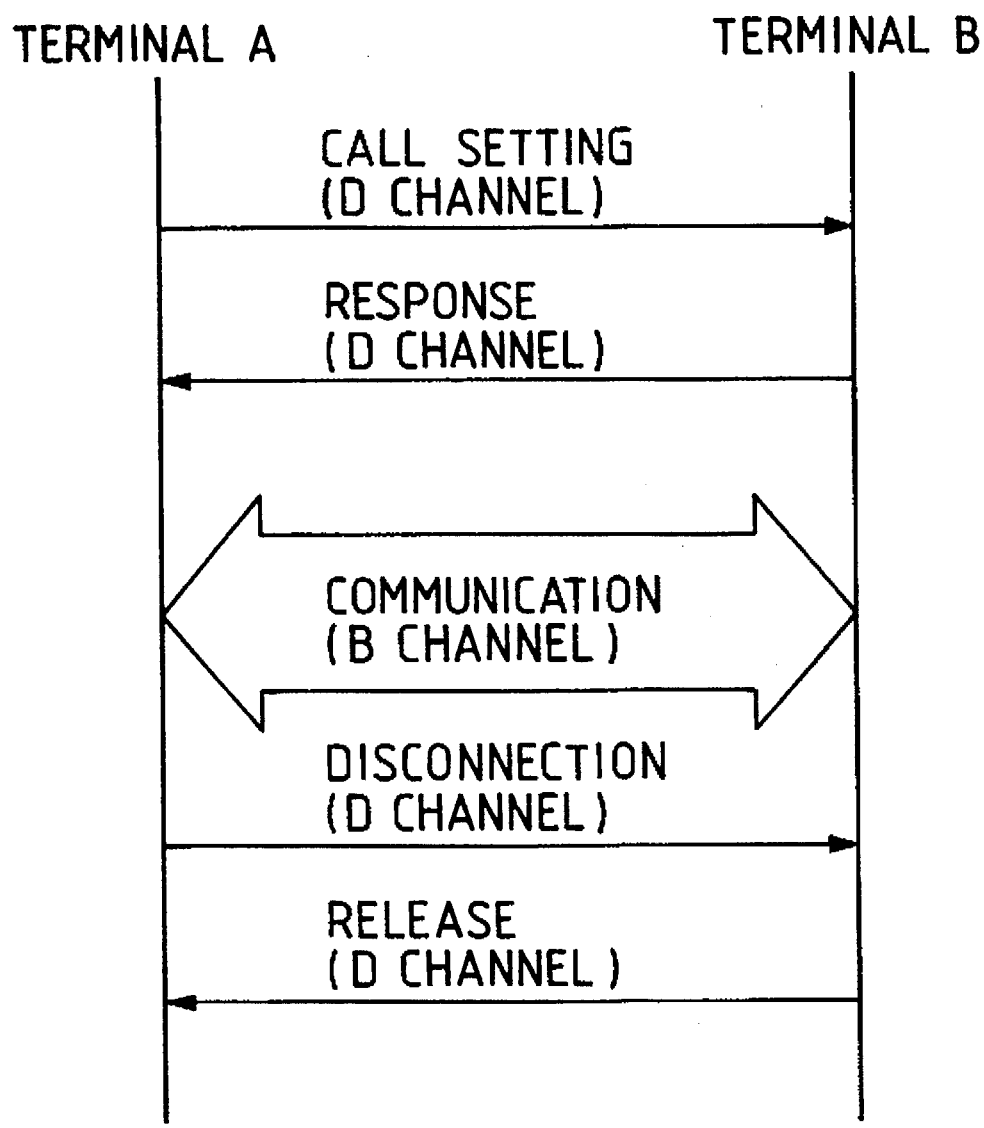
FIG. 2 is a view showing the sequence of communication by an ISDN line.

In the communication utilizing the ISDN line, a call is made by an outbound signal by the D channel. As shown in FIG. 2, communication in the B channel is rendered possible by a call setting from a terminal A to another terminal B and a response from the terminal B to the terminal A.

Though there are other communication channels such as D, H0 and H1, the explanation will be concentrated on the B channel only.

Then, in the B channel, in which the communication is thus rendered possible, there is executed, as shown in FIG. 3, an in-band signal procedure (for assigning the B channel to a data part and a control part and controlling the data communication by said control part) according to the recommendation H.242.

The above-mentioned control will be hereinafter called the in-channel control procedure. In the execution of the above-mentioned in-channel control, there are required control bits in the B channel, and the frame structure of the control bits is defined by the recommendation H.221.

Figure 4A:
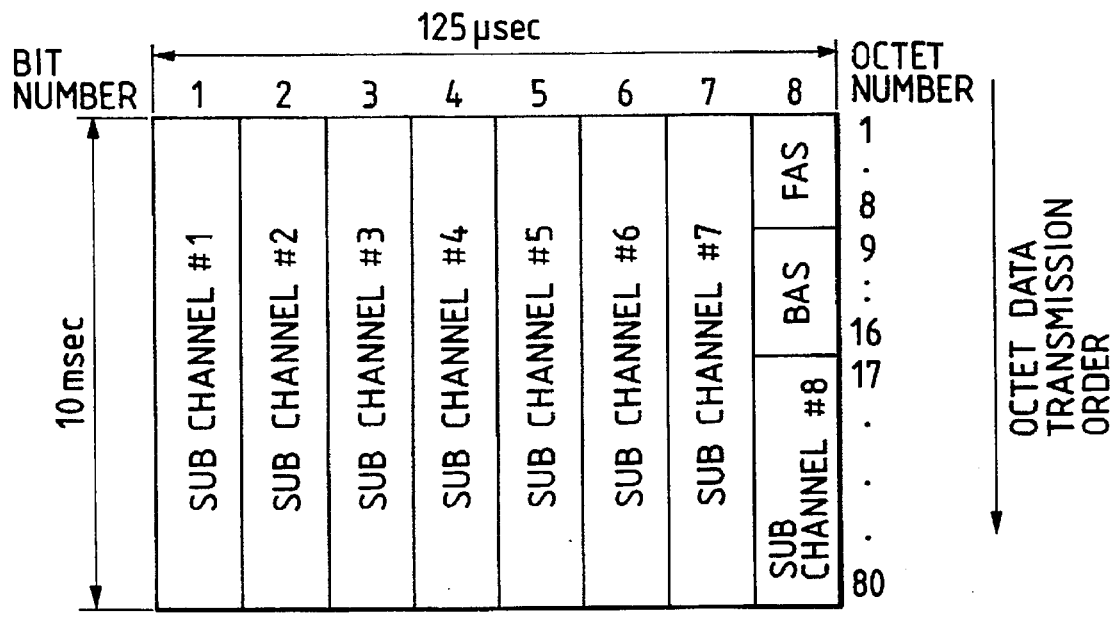
FIGS. 4A to 4C are views showing a multi-frame channel defined by H.221.
Figure 4B:
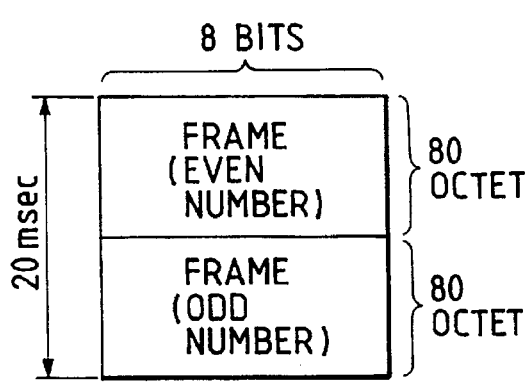
Figure 4C:
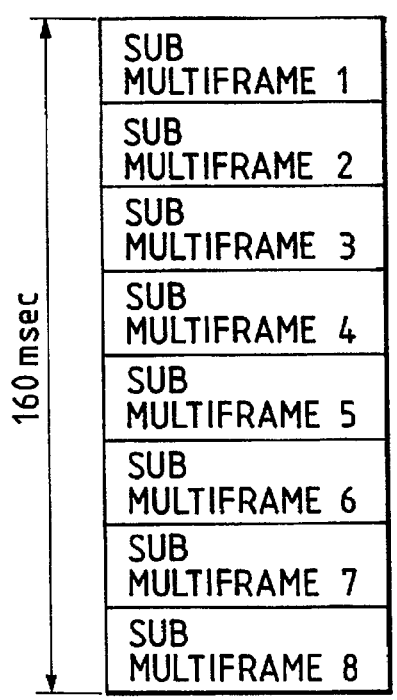
Figure 9B:
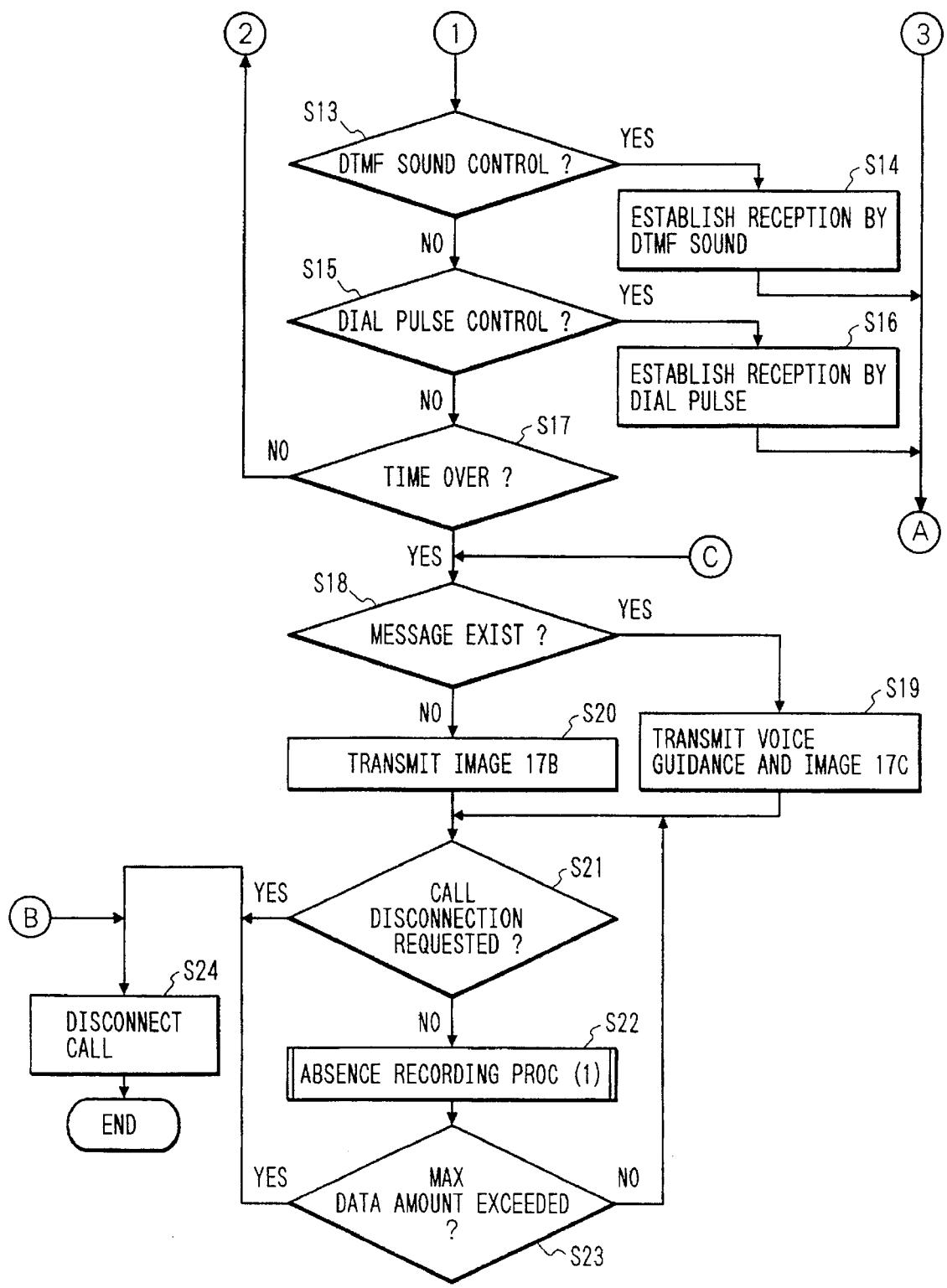
FIG. 9, comprised of FIGS. 9A and 9B, to FIG. 16 are flow charts showing operation of communication in an embodiment of the present invention.
Figure 10:
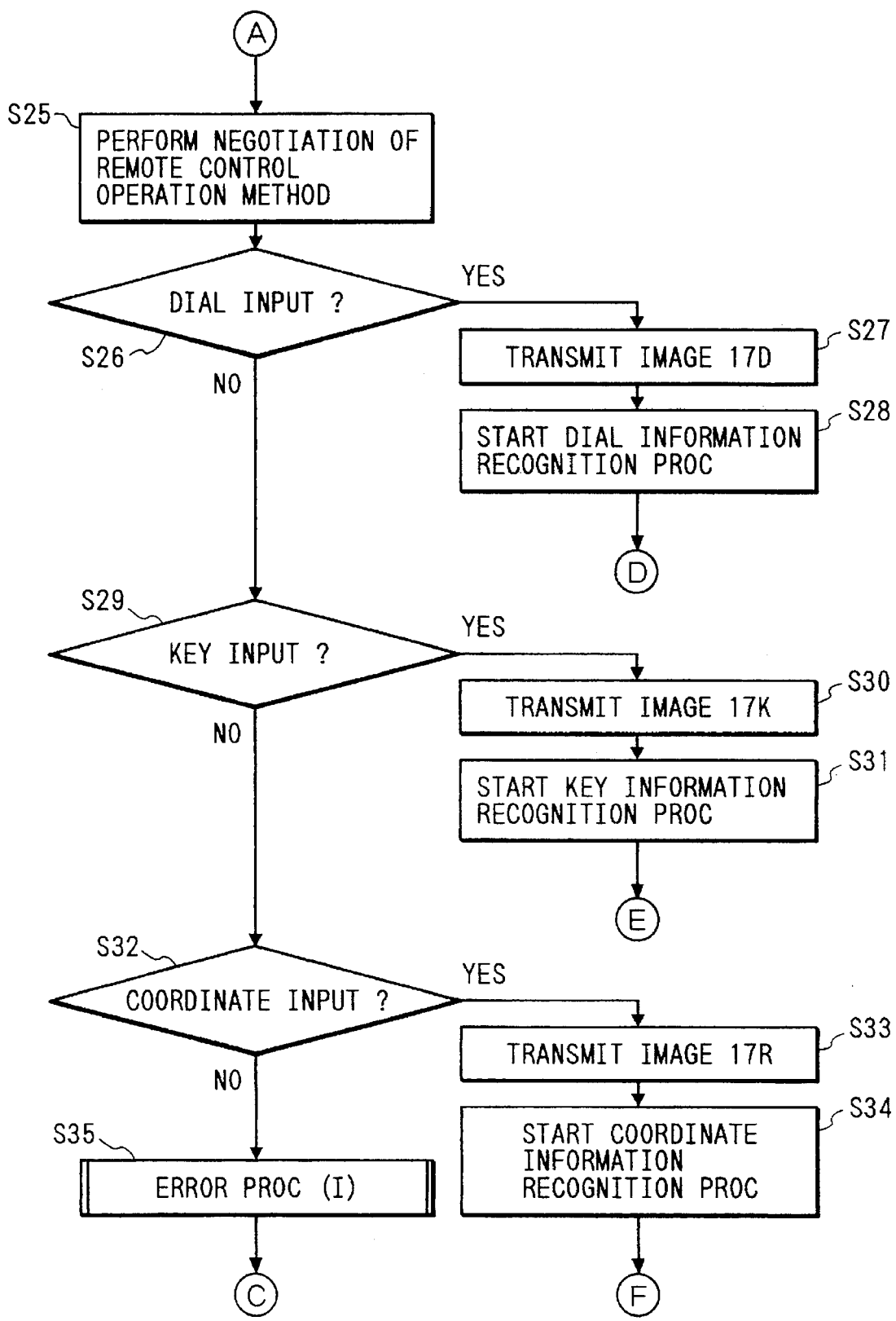
Figure 11:
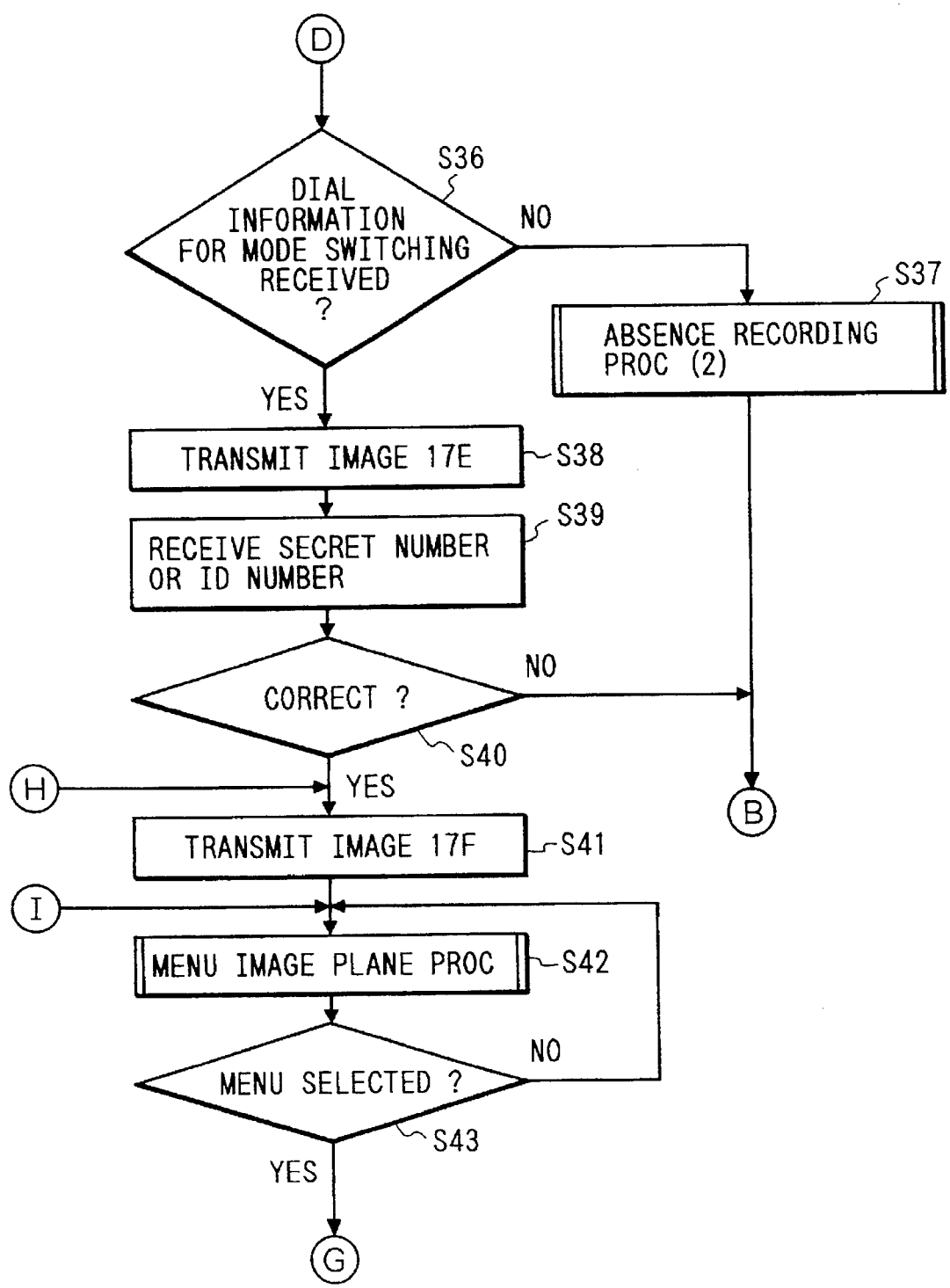

The above-mentioned frame structure is shown in FIGS. 4A to 4C. The multi-frame structure shown in FIGS. 4A to 4C corresponds to the B channel (64 Kbps). FIGS. 4A, 4B and 4C respectively show the frame structure, the sub-multi-frame structure and the multi-frame structure.

The multi-frame structure is based on 1 octet/125 μsec and is constructed by FIG. 4A 1 frame=80 octets, FIG. 4B 1 sub multi-frame=2 frames, and FIG. 4C 1 multi-frame=8 sub multi-frames, with definition of sub channels #1 to #8 of 8 Kbps each in the direction of bits.

However, the sub channel #8 alone has a transfer rate of 6.4 Kbps, with insertions of FAS (frame alignment signal) and BAS (bitrate allocation signal) as the control bits.

The in-channel control of the B channel is made possible by said FAS and BAS.

The FAS is used for the synchronization of the frame and the multi-frame.

The BAS is used for the information exchange or the setting of the terminal ability required for determining the multiplexing method for example for the sub channels. The BAS can be changed for every sub multi-frame (20 msec) even in the course of data communication.

In the following there will be explained the procedure of communication with reference to FIG. 3.

When the B channel is enabled for communication, both the terminals A and B transmit the FAS. The terminal ability in this state is mode 0 (mode for audio, FAS and BAS only) of the initial state. The transmitted FAS is searched by the partner terminal, and, when the condition for frame synchronization defined in H.242 is satisfied, the FAS is transmitted with a bit A, in the bit structure shown in FIG. 5A, set as "0". By receiving A=0, the terminal confirms that the partner terminal has established the frame synchronization.

Then the transmission ability of the own terminal is transmitted by the BAS to the partner terminal, in order to mutually recognize the ability of the partner terminal, thereby achieving so-called exchange of the transmission ability.

If both terminals are capable of communication at this point, the data communication is started. If a change in the ability is necessary, the desired terminal ability is transmitted as a command by the BAS, and the data communication is started after the desired terminal ability is set at the partner terminal.

The data communication is conducted independently in each direction, and the establishment of synchronization and the setting of terminal ability is also conducted independently. Consequently there may result an error in synchronization in one direction only, and the kinds of data may be different in both directions.

When the call is to be disconnected after the completion of data communication, at first the disconnecting terminal (terminal A in case of FIG. 3) sets the mode 0 by the BAS. Thus the in-channel control of the B channel returns to the initial state. Then the disconnection and release are executed by the outbound procedure of the D channel as shown in FIG. 2, whereby all the communications are completed.

FIGS. 5A to 5C show the bit structure in the FAS.

A bit A indicates the error in the frame synchronization. A bit E indicates the error in CRC. Bits C1, C2, C3 and C4 are CRC4 bits. Bits N1 to N5 are used for numbering the multi-frames. Bits R1 to R4 indicate the channel numbers. A bit TEA indicates a terminal alarm, which is set at "1" if the input signal cannot be received or responded due to a failure in the terminal.

FIGS. 6A and 6B show the bit structure of the BAS.

As shown in FIG. 6A, the upper three bits represent attribution, and remaining 5 bits indicate the value thereof. FIG. 6B shows the contents of such attribution. The attribution value defines, for example, the transfer rate, kind of codec, parameters specific to each media etc.

The control information (BAS) generated in the system control unit 12, the audio data from the voice encoding unit 5b and the image data from the image encoding unit 10b are thus multiplexed in the multiplex/demultiplex unit 13 as data of H.221 format, and are transferred to the line interface unit 14.

On the other hand, the data of H.221 format, received from the B channel, are separated in the multiplex/demultiplex unit 13 into the control information (BAS, FAS) and the data of various media (voice, image and data), and the voice data and the image data are respectively supplied to the voice decoding unit 5b and the image decoding unit 10b while the control information is transferred to the system control unit 12.

If the partner terminal is capable of communicating the operation information by the control information (BAS), there is discriminated, by an identifier in the control information, whether said information is operation information, and, if so, said information is transferred to and decoded in the remote control information recognition unit 23.

If the operation information can be communicated by the packet communication procedure of the D channel, said information is communicated as user data in the D channel packet, then extracted from the user data and transferred to and decoded in the remote control information recognition unit 23.

Also if the data communication of the B channel is utilized, the operation information is communicated as data to be demultiplexed according to H.221 (for example HSD or LSD), or as data only without relying on the recommendation H.221. In this case both terminals have to have a same communication protocol.

Also data communication by modem is possible, in the analog line mode.

The voice data conversion unit 16 identifies the depressed key, by detecting the DTMF tones from the analog voice decoded by the voice decoding unit from the voice data received from the partner terminal. FIG. 7 shows the correspondence between the key and the DTMF tones.

The voice conversion unit 16 extracts two frequences respectively belonging to high and low frequency groups, then recognizes a key corresponding to the extracted frequencies end transfers the information of said key to the system control unit 12.

The image synthesis unit 18 synthesizes the image data from the image input unit 9a and the graphic generation unit 17 and transfers the synthesized data to the image encoding unit 10a.

The image format in said synthesis is, for example, 640 pixels in the horizontal direction and 480 lines in the vertical direction, as employed in the personal computers.

The image synthesis can be achieved, for example, by providing the text VRAM with the attribution information such as the character information end location information for displaying graphic data and the attribution information for assigning the location of the image information, storing the location information into a flag memory (not shown) provided in the graphic generation unit 17, and transferring the image data of the image input unit to the image encoding unit when the attribution information corresponding to the location of the image information is read, bat otherwise transferring the graphic data.

The attribution information further includes color information to be used for performing a coloring by the graphic generation unit 17. The color information is to release color data designated by a look-up table provided in the graphic generation unit 17. However, since the number of simultaneously displayable colors is usually less than the number of colors in the look-up table, there is normally provided a conversion table indicating the correlation between the code data and the location of the color data designated by the look-up table, and there is adopted a method of converting the code data of color information to a location of color data in the look-up table and releasing the color data of said location from the look-up table.

The image data thus synthesized are compressed in the image encoding unit 10a.

This image compression is proposed by the recommendation H.261 of ITU-Y (formerly CCITT), and, as long as this recommendation is followed, mutual communication with a TV telephone based on other recommendations.

The H.261 recommendation adopts a universally common video signal format, in order to enable mutual communication among the various existing formats of video signal, such as NTSC, PAL and digital television format.

This common format, called CIF format, is based on sample numbers of 352 pixels×288 lines for the luminance Y, and 176 pixels×144 lines for the color difference signals Cr, Cb.

A QCIF format, corresponding to ¼ of the CIF format, is defined by sample numbers of 176 pixels×144 lines for the luminance Y, and 88 pixels×72 lines for the color difference signals Cr, Cb.

A GOB format, corresponding to 1/12 of CIF format or ⅓ of the QCIF format, is defined by 176 pixels×48 lines for the luminance and 88 pixels×24 lines for the color differences Cr, Cb.

Examples of the compression method include:

intraframe encoding, based on two-dimensional DCT transformation by dividing the frame data into blocks of 8×8 pixels, utilizing a fact that, in the image of a natural scene, there is a strong correlation among the pixels and the frequency components are concentrated in the low frequency region and are sparse in the high frequency region;

interframe encoding, based on two-dimensional DCT transformation on blocks of 8×8 pixels, derived from the interframe difference, when there is a strong correlation in the image blocks of a corresponding position between the current and preceding frames;

movement compensation, in case an image block moves in a similar form from the preceding frame to the current frame, by transmitting the information on the amount and direction of the movement of said image block instead of transmitting the entire image data;

zero run-length encoding, utilizing a fact that the coefficients for each frequency after DCT transformation are usually non-zero in the low frequency region but are mostly zero in the high frequency region;

variable quantizing, in which the quantizing step width is varied according to the amount of data thereby regulating the amount of output data;

variable length encoding, by assigning short codes for the data patterns of higher frequency of appearance and longer codes for the data patterns of lower frequency of appearance, thereby converting the generated data into data of a reduced amount in total; and frame skipping, in which the frames are suitably skipped thereby discharging a part of the image data.

Thus the plural compression methods are used in hybrid form to enable communication of the moving image even at a low transfer rate.

In the following there will be explained the method of operation, with reference to flow charts shown in FIGS. 9A to 16 and examples of transmitted image shown in FIGS. 17A to 17V.

When an absence mode is selected, the system control unit 12 can automatically receive the call and effect the automatic response when the receiver is absent.

Figure 17B:
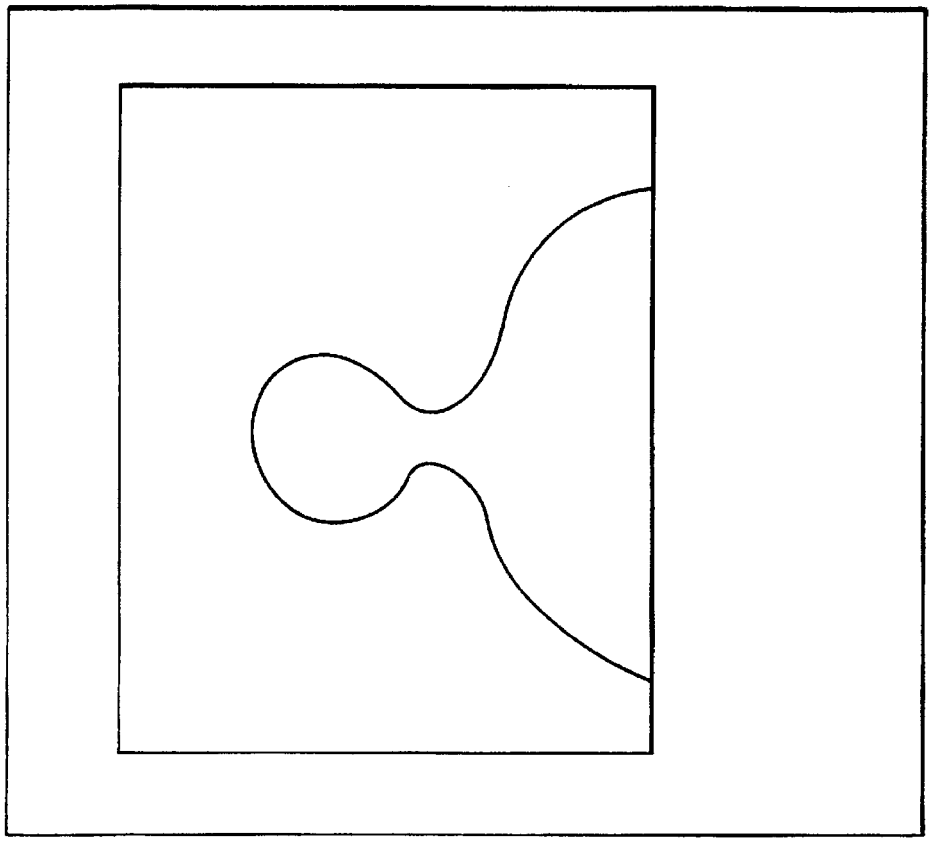
FIGS. 17A to 17V are views showing examples of the image data to be transmitted in an embodiment of the present invention.
Figure 17A:
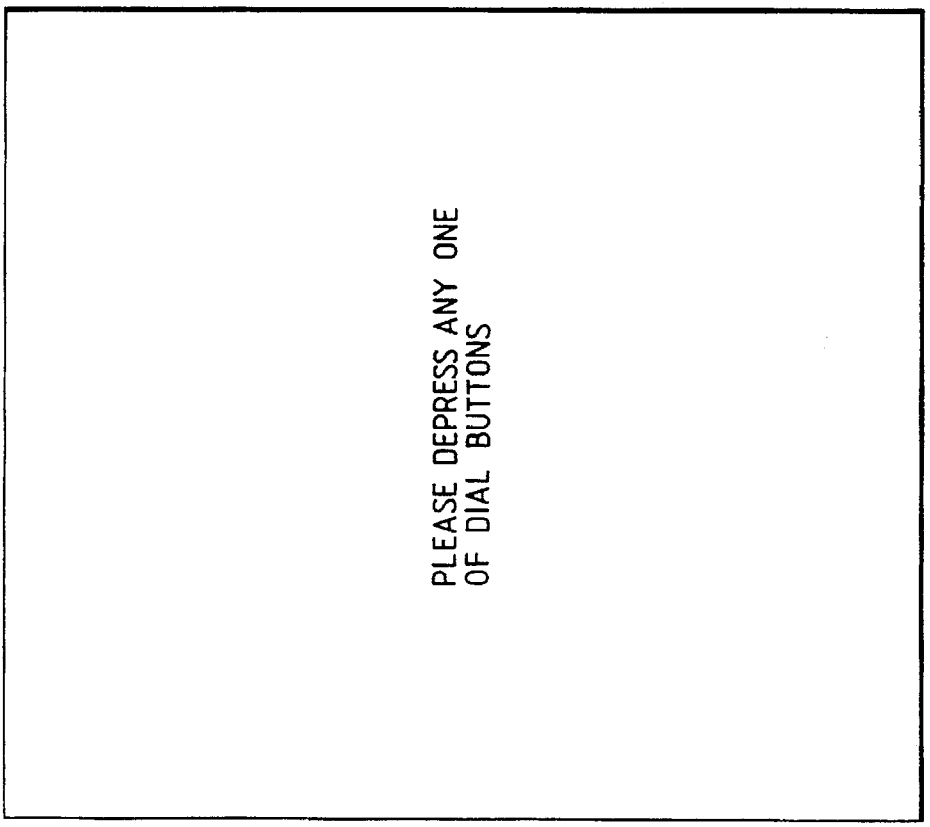

When this automatic reception process (S1 in FIG. 9A) connects the call (S2 in FIG. 9A) to enable transmission, the remote control communication method is negotiated and an image shown in FIG. 17A is transmitted to the partner terminal.

The image data shown in FIG. 17A are guidance message data for confirming whether the partner terminal it capable of generating DTMF tones, and are generated in the following manner. Data corresponding to a train of character codes indicating the message "Please depress any of the dial buttons" are read by the character generator from the text VRAM in the system control unit 12, and are converted into graphic data after developing the data onto a bit map.

In this case, the image synthesis unit 18 transmits the graphic data to the image encoding unit 10a without synthesis with the image data from the image input unit 9a since such image data are not input from the unit 9a.

The image encoding unit 10a effects matrix conversion of the received R, G, B image data into Y, Cr, Cb data of the CIF or QCIF format and intraframe encoding.

Thus encoded image data for the guidance message are transmitted, through the multiplex/demultiplex unit 13 and the line interface unit 14, to the partner terminal. In the following description, it is assumed that the images for guidance messages are intraframe encoded by the image encoding unit 10a.

The partner terminal decodes thus transmitted image data to provide a display, and the operator of the partner terminal visually recognizes the message shown in FIG. 17A and depresses any of the dialling buttons.

The system control unit 12 discriminates whether the voice data conversion unit 16 has recognized the DTMF tones in the voice signal received from the partner terminal, and effects negotiation to discriminate whether the data communication is possible.

The communication method for remote control can be, for example, the D channel packet control, BAS command control, data communication control, modem communication control, DTMF tone control or dial pulse control, and the following procedure is employed for confirming which communication method is available for the control.

In the following there is shown the procedure for the communication by the digital line.

At first there is confirmed whether the control by the D channel packet is employed (S5), and, if so, the communication by the D channel packet control is established (S6).

The D channel packet control is possible if the terminal has the ability therefor, as this control is available as a bearer service in the ISDN network service.

Then, there is confirmed whether the control by the BAS command is employed (S7), and, if so, the communication by the BAS command control is established (S8).

The BAS command control effects communication as an independent mode utilizing an independent identification code, for example the undefined command in the BAS commands shown in FIG. 6B, for distinguishing from the independent mode of other terminals.

Then there is confirmed whether the control by the data communication in the B channel is employed (S9), and, if so, the communication by the data communication control is established (S10).

Among such data communication methods, the ISDN bearer service provides data communication by B channel unlimited digital communication. Also within the ITU-T H series recommendations, LSD (low speed data) and HSD (high speed data) data communications are available. Whether such data communication is supported can be recognized by the ability exchange by the BAS command, and the data communication is thus rendered possible according to the H.221 format.

The procedure for the communication by the analog line is as follows.

At first there is confirmed whether the control by the modem communication is employed (S11), and, if so, the communication by the modem control is established (S12).

The modem communication requires that a same modulation method is used both at the transmission and at the reception. For this reason, the mutual communication is usually established by setting an equalizer by receiving modulated training data from the partner terminal, then receiving and analyzing control data and transmitting responding data.

Then there is confirmed whether the control by the DTMF tones is employed (S13), and, if so, the communication by the DTMF tone control is established (S14).

In case of the DTMF tone control, the confirmation is possible, when the operator of the partner terminal depresses a button in response to the image in FIG. 17A transmitted in the step S4, by the generation of the DTMF tone corresponding to the depressed button.

Then there is confirmed whether the dial pulse control is employed (S15), and, if so, the communication by the dial pulse control is established (S16).

The dial pulses, available in 10 or 20 ppm, are usually not transmitted to the destination terminal but used for the network to recognize the calling number. However the receiving terminal, upon reception of these pulses, can recognize a key input corresponding to the received dial pulses.

In the digital communication methods, there can be confirmed that the communication is not possible until the negotiation for the communication method is completed. On the other hand, among the analog communication methods, negotiation is not possible for certain communication methods, for which confirmation by timer inspection is adopted.

In case of the communication method by such timer inspection, after the transmission of the guidance message image data in the step S4, there is discriminated whether a predetermined time has elapsed (S17), and, if not, the sequence returns to the step S11.

On the other hand, if the predetermined time has elapsed, the remote control from the partner terminal is identified not possible, and the ordinary message telephone function is started.

At this point, there is confirmed whether a message for the partner terminal is present (S18). If there is no particular voice message (guidance) is absent, image data as shown In FIG. 17B are read from the storage unit 15, then encoded and transmitted to the partner terminal (S20). On the other hand, if there is a voice message such as "Receiver is presently out. If you have a message, please leave it after a signal tone", the image data are read from the storage unit 15, then synthesized in the image synthesis unit 18 with the graphic data, representing the voice message, from the graphic generation unit, then encoded and transmitted to the partner terminal.

After the transmission of the image data or the image and message data in this manner, there is discriminated the presence of a request for call disconnection (S21), and, if absent, there is initiated a message recording procedure for receiving, decoding and recording the voice and image data from the partner terminal into the storage unit 25 (S22).

Then there is discriminated whether the capacity of the storage unit 15 has been exceeded (S23), and, if not, the sequence returns to the step S21 to repeat the same sequence, but, if the capacity has been exceeded, the call is disconnected (S24) and the sequence is terminated. On the other hand, if there is the request for call disconnection, the sequence skips the steps S22 and S23 and proceeds to the step S24 to disconnect the call, whereupon the sequence is terminated.

Then, when the remote control communication method from the partner terminal is established, a step S25 executes negotiation for the remote control operating method.

The negotiation of the remote control operating method is conducted by thus established remote control communication method, and, if the operating abilities can be exchanged, the mutual operating methods are optimized by the data formats shown in FIGS. 8A to 8D.

FIG. 8D shows a data format used for exchanging the operating abilities and consisting of an identifier indicating the data for operating ability; a type classification for specifying the operation input method (for example mouse, pen or key); and auxiliary information for the type classification (data format and kinds of keys in case of a mouse; coordinate data format and control data format in case of pen input; and keyboard type and terminal type in case of keyboard input).

The receiving and transmitting terminals exchange the above-explained operating abilities to recognize the operating methods mutually, and there is thus determined an operating method transmittable by the transmitting terminal and receivable by the receiving terminal.

More specifically, at first the receiving terminal discriminates whether the input from the partner terminal is dial input (S26), and, if so, the image data from the storage unit 15 and the graphic data from the graphic data generation unit 17 are synthesized (cf. FIG. 17D) and transmitted to the partner terminal (S27). At this stage, a voice guidance such as "Receiver is out. If you have a message, please leave it by using the push buttons (PB) for the displayed functions" is read from the storage unit 15 and transmitted to the partner terminal.

Figure 17D:
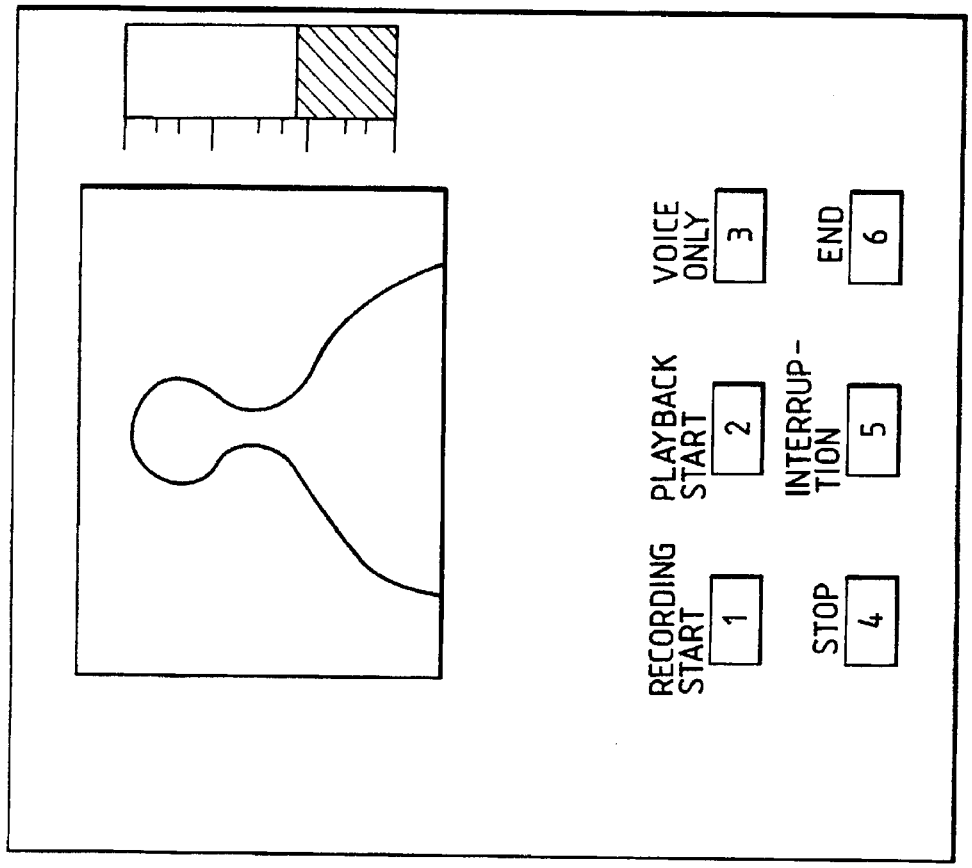
Figure 17C:
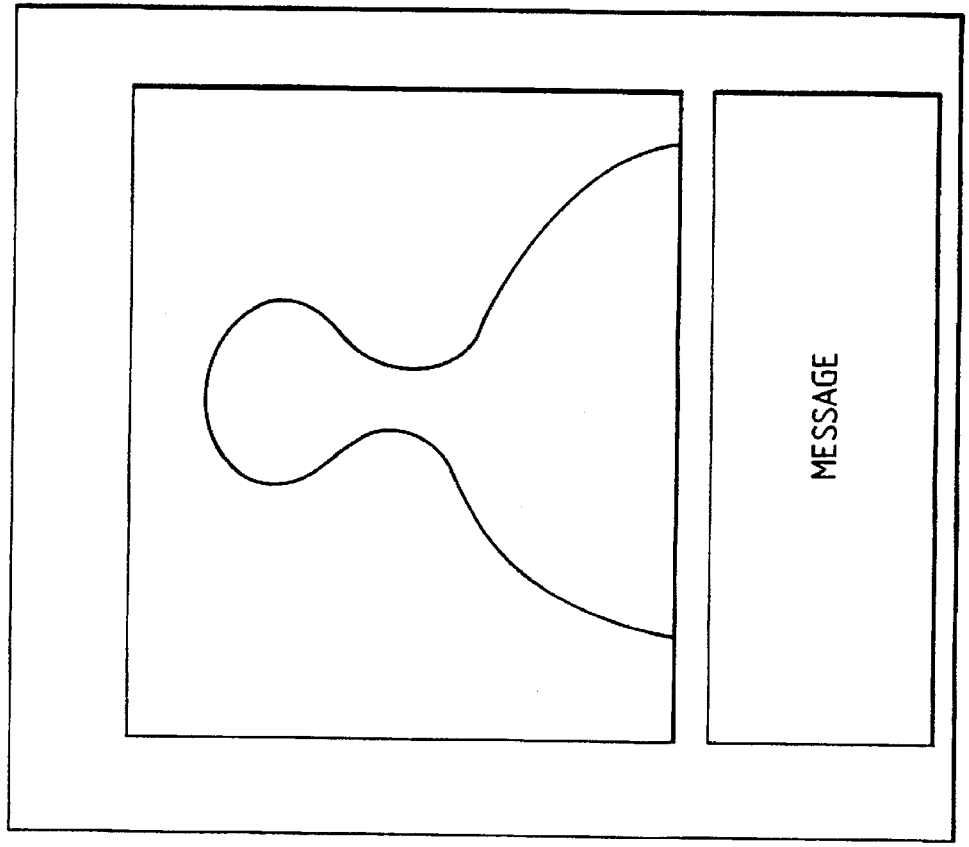

At the partner terminal, the operator visually recognizes the received image as shown in FIG. 17D, and depresses a push button "1" for recording, "5" for intermediate interruption, "2" for reproduction of the recorded data for confirmation, or "6" for terminating the communication, whereupon a DTMF tone corresponding to the depressed button is transmitted and the present terminal can effect control corresponding to the DTMF tone of the partner terminal. In this manner this terminal can effect the message recording by the remote control from the partner terminal (S28).

Then there is discriminated whether the key input operating method is employed (S29), and, if so, the image data from the storage unit 15 and the graphic data from the graphic generation unit 17 are synthesized (cf. FIG. 17K) and transmitted to the partner terminal (S30). At the same time there is transmitted guidance control information for causing the partner terminal to transmit data indicating the key operation to be explained later, in response to the key input. Furthermore a voice guidance such as "Receiver is out. If you have a message, please leave it by using the keys of the keyboard for the displayed functions" is read from the storage unit 15 and transmitted to the partner terminal.

Upon receiving the guidance control information, the partner terminal so functions as to transmit the data entered from the keyboard thereof. The operator of the partner terminal visually recognizes the received image as shown in FIG. 17K, and depresses a key "A" for message recording, "D" for intermediate interruption, "B" for reproduction for confirmation of the recorded data, or "F" for terminating the communication, whereupon data indicating the key operation are transmitted according to the above-mentioned guidance control information and the remote control operation recognition unit 23 identifies the key input information from the transmitted key information to enable this terminal to effect control according to said key input information. In this manner this terminal can effect the message recording by the remote control from the partner terminal (S31).

FIG. 8B shows the data format for transmitting the key operation. The format consists of an identifier indicating the key operation information; a type designation indicating the key type; and key control information representing code data of the keys and the on/off state thereof.

Subsequently there is discriminated whether the operating method between the terminals is by coordinate input (S32), and, if so, the image data from the storage unit 15 and the graphic data from the graphic generation unit 17 are synthesized (FIG. 17Q) and transmitted to the partner terminal (S33). At the same time there is transmitted guidance control information for causing the partner terminal to transmit data representing coordinate input to be explained later, corresponding to the coordinate input for example by a mouse or a pen input. Furthermore a voice guidance such as "Receiver is out. If you have a message, please leave it by operating the displayed functions with a mouse or a pen" is read from the storage unit 15 and transmitted to the partner terminal.

Figure 17F:
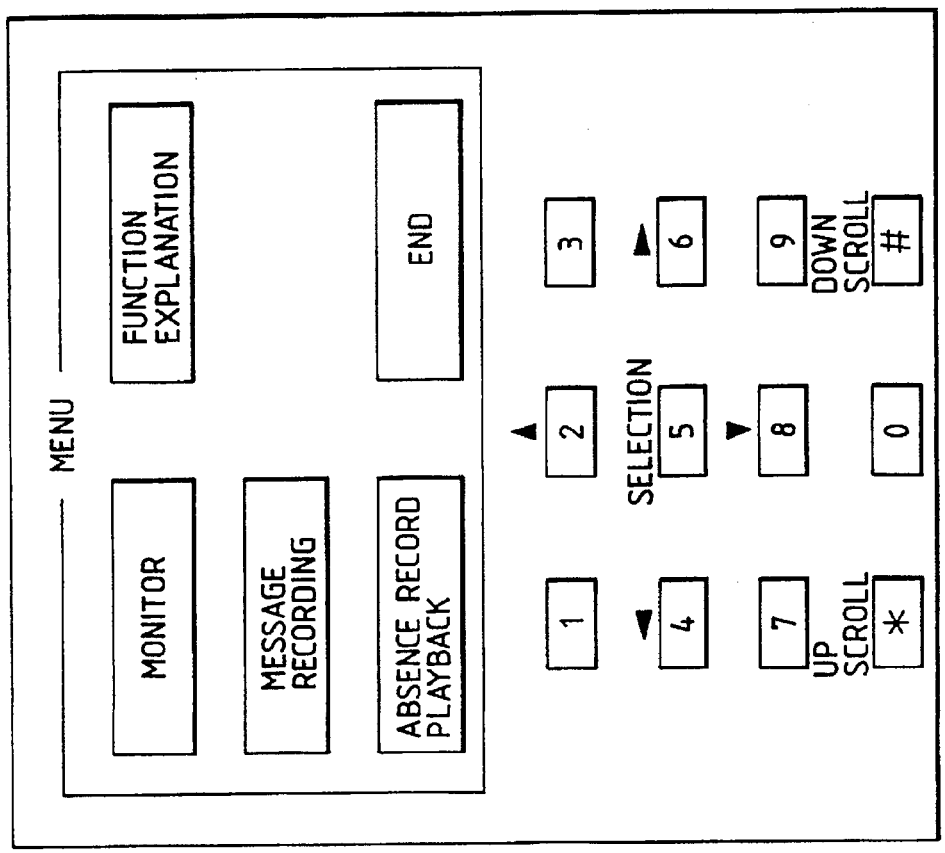

Upon receiving the guidance control information, the partner terminal so functions as to transmit the data entered from the operation unit thereof. The operator of the partner terminal visually recognizes the received image as shown in FIG. 17Q, and selects, for message recording, the start button of the recording menu by bringing the pointer with a mouse and clicking the button thereof, or attaching the point of an input pen to said start button, or bringing the point of an input pen equipped with a button to said start button and depressing said button, or similarly selects the stop button of the recording menu for intermediate termination, the start button of the reproduction menu for reproduction for confirmation of the recorded data, or the end button for terminating the communication, whereupon data representing the coordinate input are transmitted to this terminal according to the guidance control information and the remote control information recognition unit 23 enables, based on the transmitted coordinate information, this terminal to effect control according to the coordinate information of the partner terminal. In this manner this terminal can effect the message recording by the remote control from the partner terminal (S34).

FIGS. 8A and 8B show data formats representing coordinate inputs by the mouse or the input pen.

The data format for mouse, shown in FIG. 8A, consists of an identifier indicating the mouse operation information; a type designation indicating the type of the mouse; key control information indicating the click button and the on/off state thereof; and pointing control information indicating the coordinate position. Also the data format for the input pen, shown in FIG. 8B, consists of an identifier indicating the operation information entered by the pen; a type designation indicating the type of pen input; key control information indicating, in case of a pen with button, the on/off state of said button; and pointing control information representing the coordinate position and the on/off state.

If corresponding operating means is absent, an error procedure therefor is executed (S35), and the sequence thereafter proceeds to the step S18 for effecting the ordinary message recording operation.

Then, in case of dial input operation, there is discriminated whether a mode available only to the owner of this terminal is entered (S36), and, if the key of a number designated in FIG. 17D is depressed, the above-mentioned mode is identified as not selected. Thus the above-explained message recording operation is executed (S37), and the call is disconnected in the step S24, whereby the sequence is terminated.

Figure 17E:
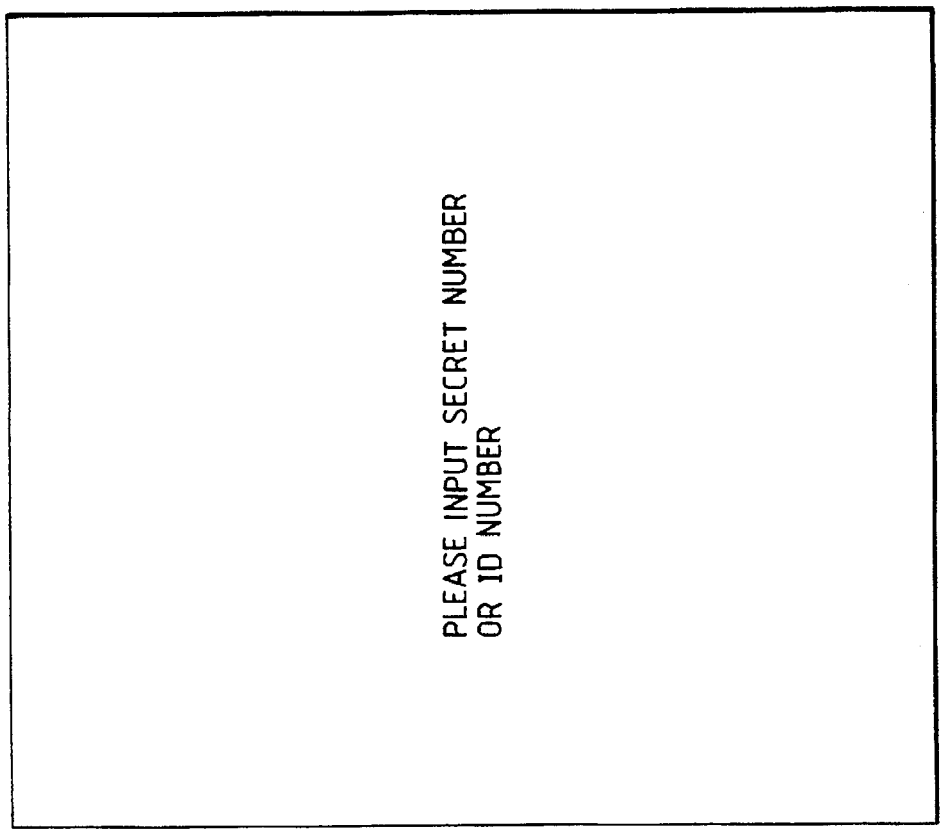
Figure 17H:
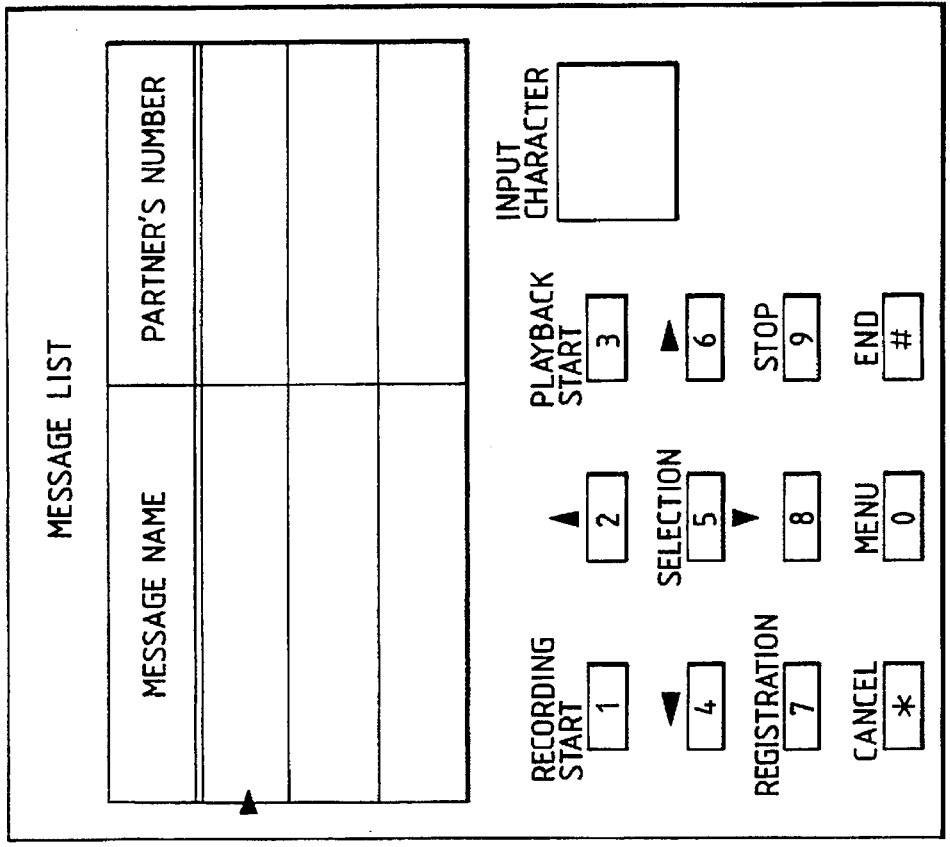

On the other hand, if the above-mentioned mode is identified as selected, by the depression of a specified key not designated in FIG. 17D or by a specified operation, guidance image data such as "Please enter secret number or ID number" as shown in FIG. 17E are transmitted to the partner terminal (S38). Then, upon receiving DTMF signals of the ID number from the partner terminal (S39), the ID number corresponding to the received DTMF tone signals is compared with that memorized in the storage unit 19, and there is discriminated whether the correct ID number has been received (S40). If the received ID number is incorrect, the sequence proceeds to the step S24 to disconnect the call, whereby the sequence is terminated. On the other hand, if the received ID number is correct, a menu image as shown in FIG. 17F is transmitted to the partner terminal (S41), and there is executed a predetermined menu image process, such as setting menu images, respectively corresponding to the menu items displayed in the menu image, in a specified register (S42).

When a desired menu item is selected at the partner terminal, from plural menu items in the menu image, by the pointer keys and the selection key, a signal corresponding to such menu selection is transmitted to this terminal. The system control unit 12 thereof discriminates whether the menu selection signal has been received (S43), and, if not, the sequence returns to the step S42, but, if received, there is discriminated whether said menu selection signal is a selection signal of the monitor image (S44).

Figure 17G:
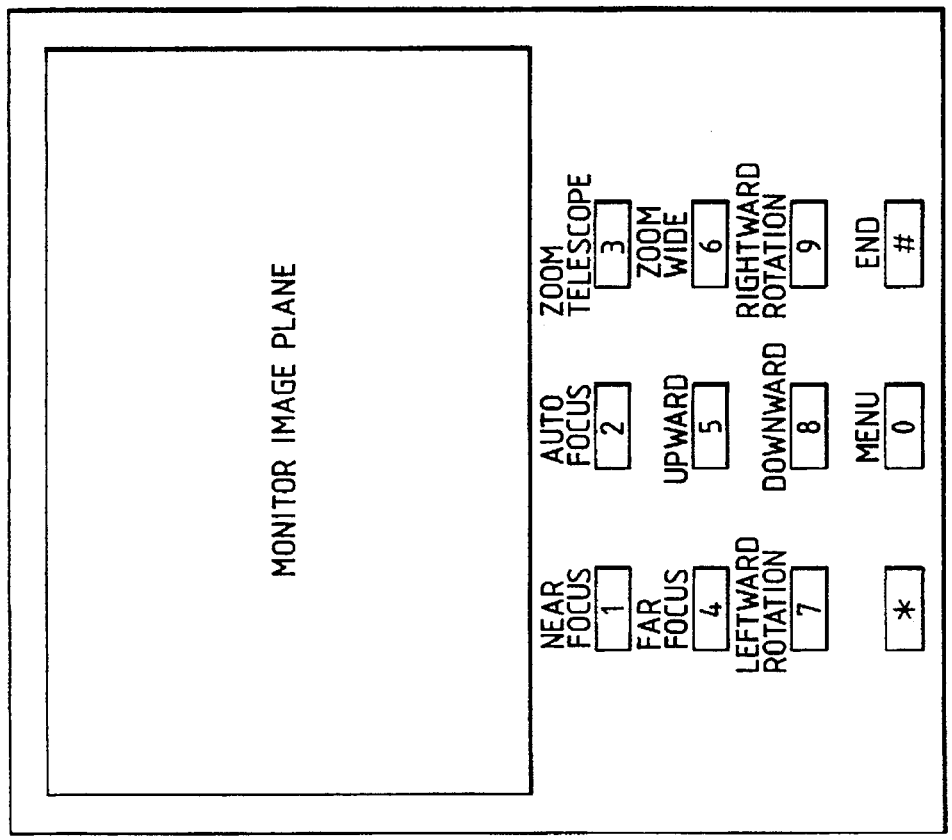
Figure 17N:
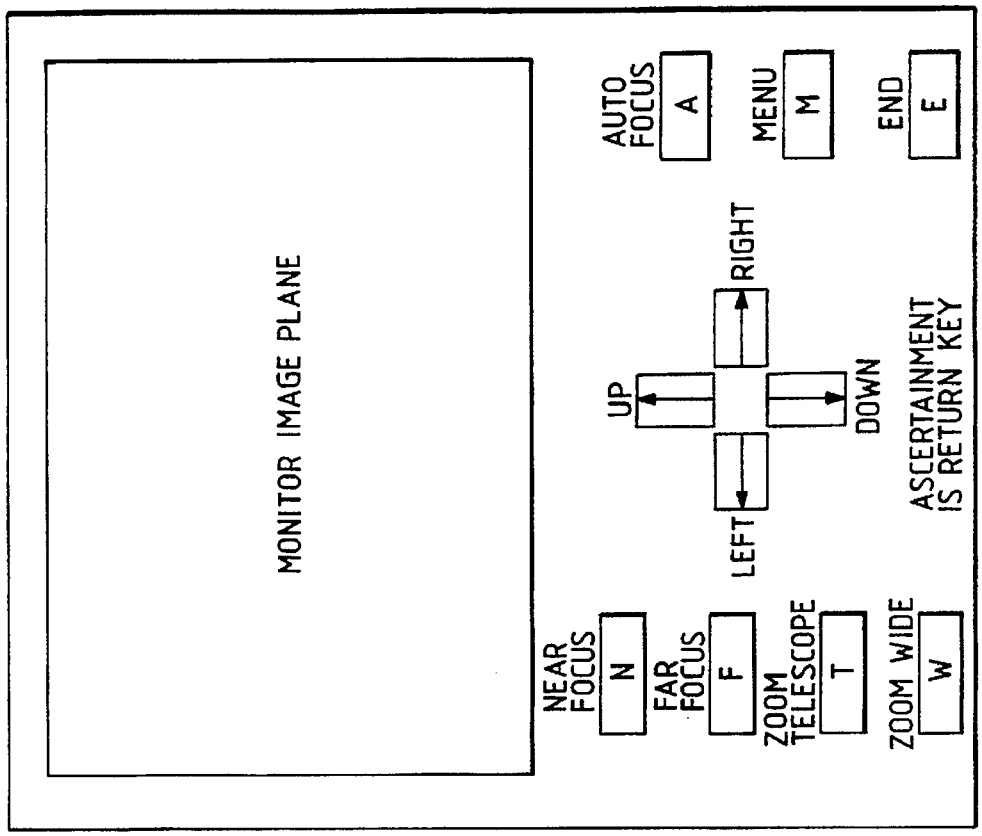

If the selection signal for the monitor image is identified, there is transmitted, to the partner terminal, an image as shown in FIG. 17G, including graphic data of push buttons PB with functions for controlling the monitor (display unit 8) and image data from the monitor (S45). In this case, the operator of the partner terminal can observe the interior of the room by focusing, turning, tilting and/or zooming a camera by remote control, through the newly assigned functions of said push buttons PB, thereby achieving security effect and confirmation of the interior.

Thus, this terminal, after transmitting the monitor image data as shown in FIG. 17G, effects monitor image process of setting new functions for the push buttons PB in said image data, and, upon receiving operation signals (DTMF tones) of the push buttons, executing the functions assigned newly to the push buttons (S46).

In the partner terminal, the end key (this function being assigned to the "#" key as illustrated) is depressed in order to terminate the communication, and the menu key (assigned to "0" key) is depressed in order to return to the menu image. This terminal discriminates whether the key operation signal (DTMF tone) of the above-mentioned menu key ("0" key) has been received (S47), and, if received, the sequence returns to the step S41. On the other hand, if the key operation signal of the above-mentioned menu key has not been received, there is further discriminated whether the key operation signal (DTMF tone) of the above-mentioned end key ("#" key) has been received (S48), and, if not, the sequence returns to the step S46 to effect the monitor image process, but, if received, the sequence proceeds to the step S24 to disconnect the call, thereby terminating the sequence.

If the step S44 identifies that the received menu selection signal is not a selection signal of the monitor image, there is then discriminated whether the received menu selection signal is a selection signal for message recording (S49), and, if so, there are transmitted, to the partner terminal, synthesized image data including, in the graphic data format, a list of messages and push buttons with assigned functions required for message recording, as shown in FIG. 17H (S50). In this case, the partner terminal can newly register a message or cancel the already registered message, utilizing the newly assigned functions of the push buttons PB. More specifically, after the transmission of the image data for message recording, as shown in FIG. 17H, this terminal effects a message recording process of setting the functions of the push buttons PB newly assigned functions in the image data, and, upon receiving the operation signal (DTMF tone) of the push button, executing the function assigned to said push button (S51).

At the partner terminal, a desired message is selected from the list of messages by arrow keys (assigned to the push buttons "2", "4", "6" and "8"), and the reproduction is started by the reproduction start key (assigned to the push button "3"), whereupon transmitted are synthesized image data as shown in FIG. 17J, including the image data of a message designated from the message data stored in the storage unit 15 and the graphic data of the push buttons PB with newly assigned function. Among the keys in the image data shown in FIG. 17J, the interruption key (push button "1") can be used for temporary interruption, and the restart key (push button "2") for restarting the reproduction.

When the stop key (push button "3") is depressed or when a message is completed, the image as shown in FIG. 17H is transmitted again to re-start the message recording process. Also in case of registering a new message, the registration key (push button "7" in FIG. 17H) is depressed and the message title is entered by the selection of characters displayed in a window "input characters".

The above-mentioned window "input characters" displays one of the characters, and the displayed character can be shifted by the operation of the arrow keys, in entering a new message. Also the partner number can be entered by the numbers of the push buttons PB. Thus, in case of recording a new message, the recording start key (assigned to the push button "1") is depressed to transmit the corresponding key operation signal to this terminal, thereby starting the recording process therein. Upon starting the message recording, this terminal transmits the image data shown in FIG. 17J to the partner terminal, thereby enabling operations same as those in the reproduction explained before.

Then the system control unit 12 of this terminal discriminates whether the key operation signal (DTMF tone) of the menu key ("0" key) has been received (S52), and, if received, the sequence returns to the step S41. If the above-mentioned key operation signal has not been received, there is further discriminated whether the key operation signal (DTMF tone) of the end key ("#" key) has been received (S53), and, if not received, the sequence returns to the S51 to continue the message recording process, but, if received, the sequence proceeds to the step S24 to disconnect the call, thereby terminating the sequence.

On the other hand, if the step S49 identifies that the received menu selection signal is not the selection signal for message recording, there is further discriminated whether said received menu selection signal is a selection signal for reproducing absence record messages (S54), and, if so, there are transmitted, to the partner terminal, synthesized image data including, in the graphic data form, a list of recorded messages and push buttons PB with assigned functions required for reproducing such recorded messages (S55). At the partner terminal, various reproducing processes for absence recorded messages can be attained by remote control, utilizing the newly assigned functions of the push buttons PB. This terminal, after the transmission of the image data for reproducing the absence recorded messages as shown in FIG. 17I, executes a reproducing process for the absence recorded messages, such as of setting the functions of the push buttons newly assigned in the above-mentioned image data and, upon receiving the operation signal (DTMF tone) of a push button, executing the function newly assigned to said push button (S56).

When the reproduction of absence recorded messages is selected on the menu image, an image shown in FIG. 17I including, in the graphic data format, a list of the recorded messages and the push buttons PB with assigned functions required for reproducing the recorded messages, is transmitted to the partner terminal.

At the partner terminal, a desired recorded message is selected by the arrow keys from the above-mentioned list, and the reproduction key (assigned to "7" push button) is depressed, whereupon the corresponding key operation signals are transmitted to this terminal. In response, this terminal transmits, to the partner terminal, synthesized image data as shown in FIG. 17J, including the image data of the recorded message designated from those stored in the storage unit 15 and the graphic data of the push buttons PB with newly assigned functions. Thus the interruption key (assigned to the push button "1") is depressed for temporary interruption, and the re-start key (push button "2") is depressed for re-starting the reproduction.

When the stop key (push button "3") is depressed or when the reproduction of the recorded message is completed, the image data shown in FIG. 17I are transmitted to again effect the process for reproducing the absence recorded messages.

The recorded message which has become unnecessary after reproduction can be deleted by the deletion key (assigned to the push button "3"). Also for reproduction by index, the index reproduction key (assigned to the push button "*") is depressed to effect reproductions in succession.

After such reproduction of recorded messages, the system control unit 12 of this terminal discriminates whether the key operation signal (DTMF tone) of the menu key ("0" key) has been received (S57), and, if received, the sequence returns to the step S41. On the other hand, if the above-mentioned key operation signal has not been received, there is further discriminated whether the key operation signal (DTMF tone) of the end key ("#" key) has been received (S58), and, if not, the sequence returns to the step S56 to continue the reproduction of the recorded messages, but, if received, the sequence proceeds to the step S24 to disconnect the call, thereby terminating the sequence.

When the step S54 identifies that the received menu selection signal is not the selection for the reproduction of the absence recorded messages, there is discriminated whether the key operation signal (DTMF tone) of the end key ("#" key) has been received (S59), and, if not, the sequence returns to the step S42 for the menu image process, but, if received, the sequence proceeds to the step S24 to disconnect the call, thereby terminating the sequence.

Figure 12:
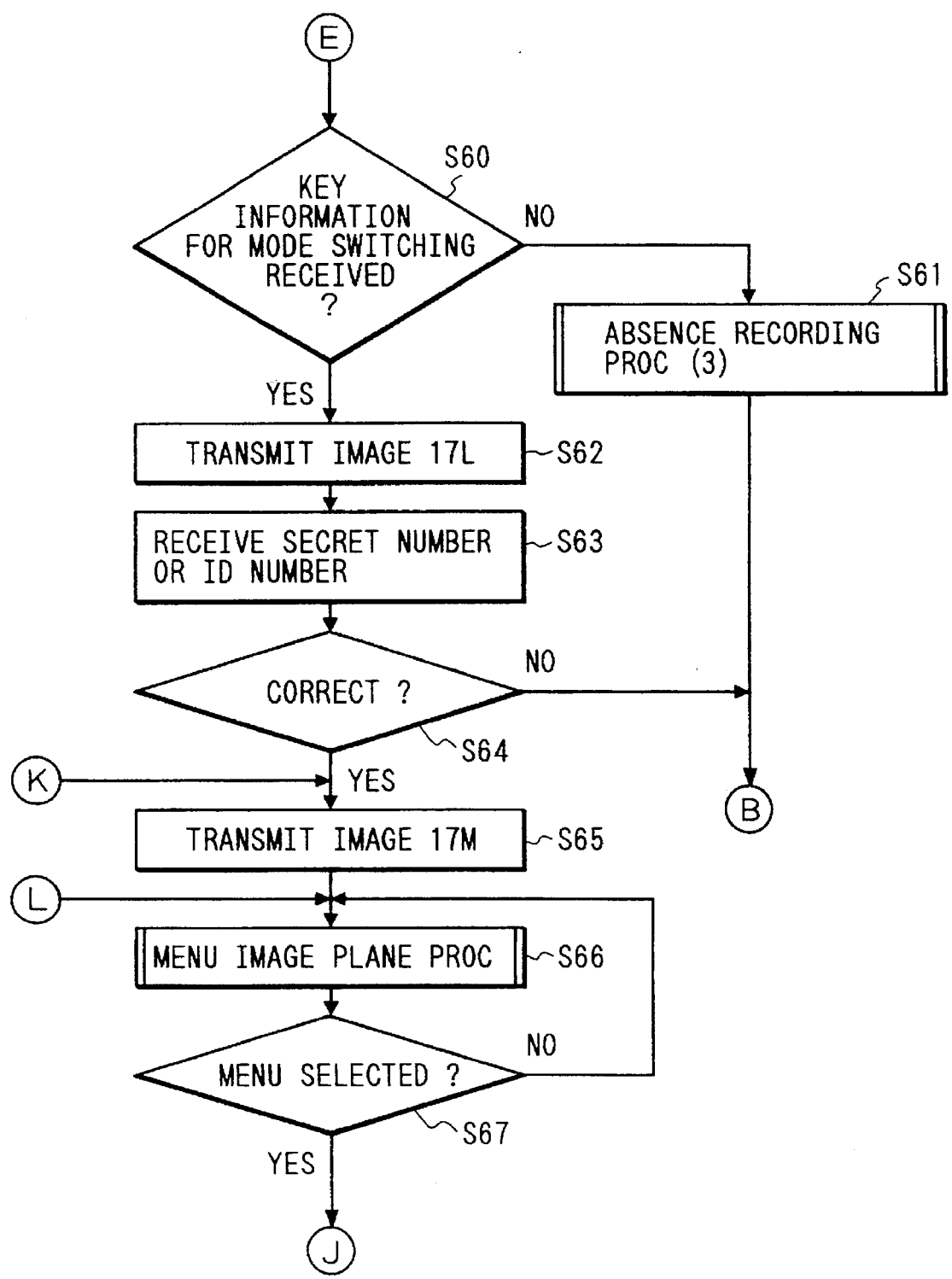
Figure 15:
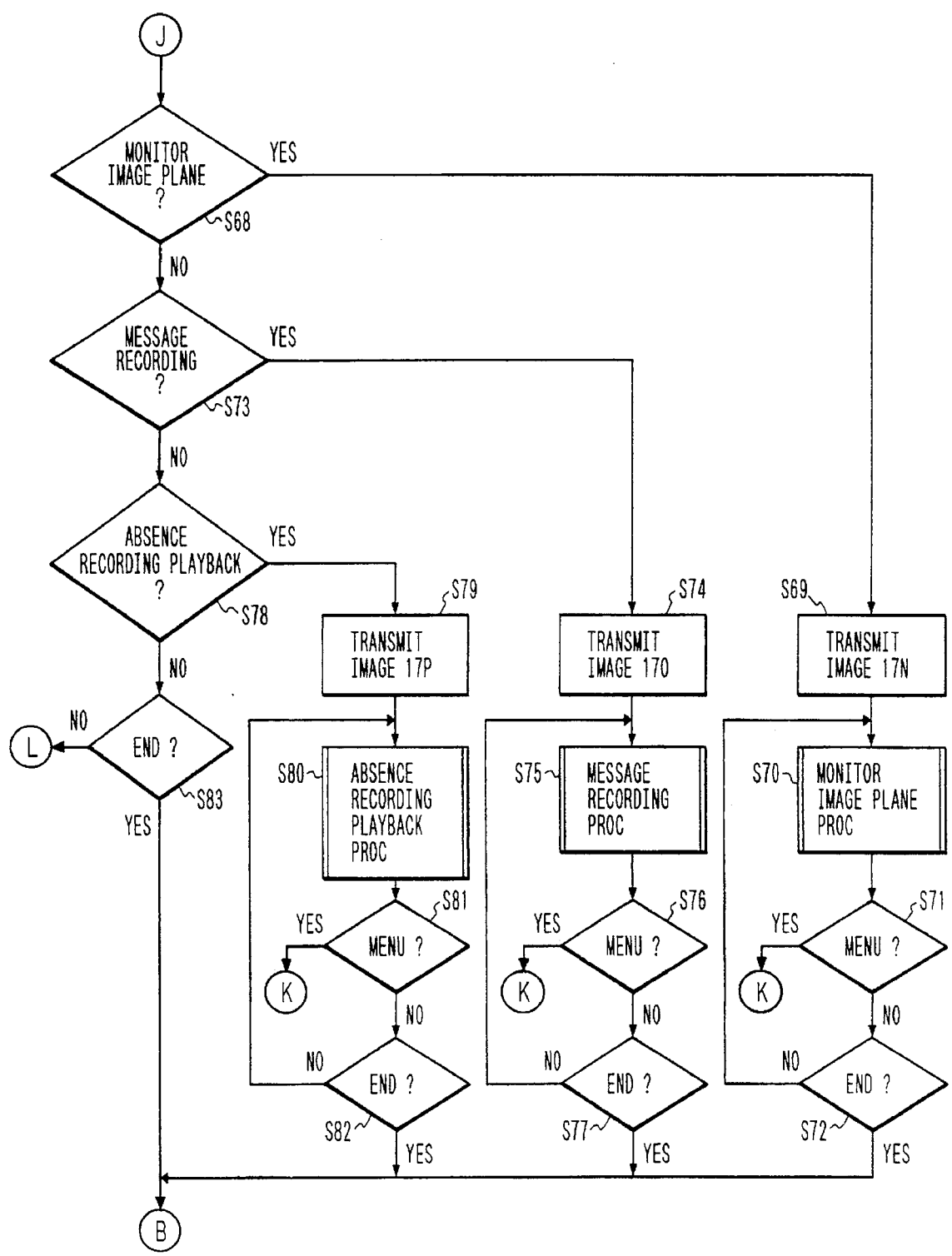

In the following there will be explained the operations by the key inputs, with reference to flow charts of steps S60 to S67 shown in FIG. 12 and steps S68 to S83 shown in FIG. 15.

The operating sequence is same as that in case of dial input, except for the transmitted images. In the following, therefore, there will only be explained the images.

FIG. 17L shows an image for entering the ID number.

The user name and the password are entered from the keyboard, and the entered information are displayed in succession in the displayed frames.

Figure 17M:
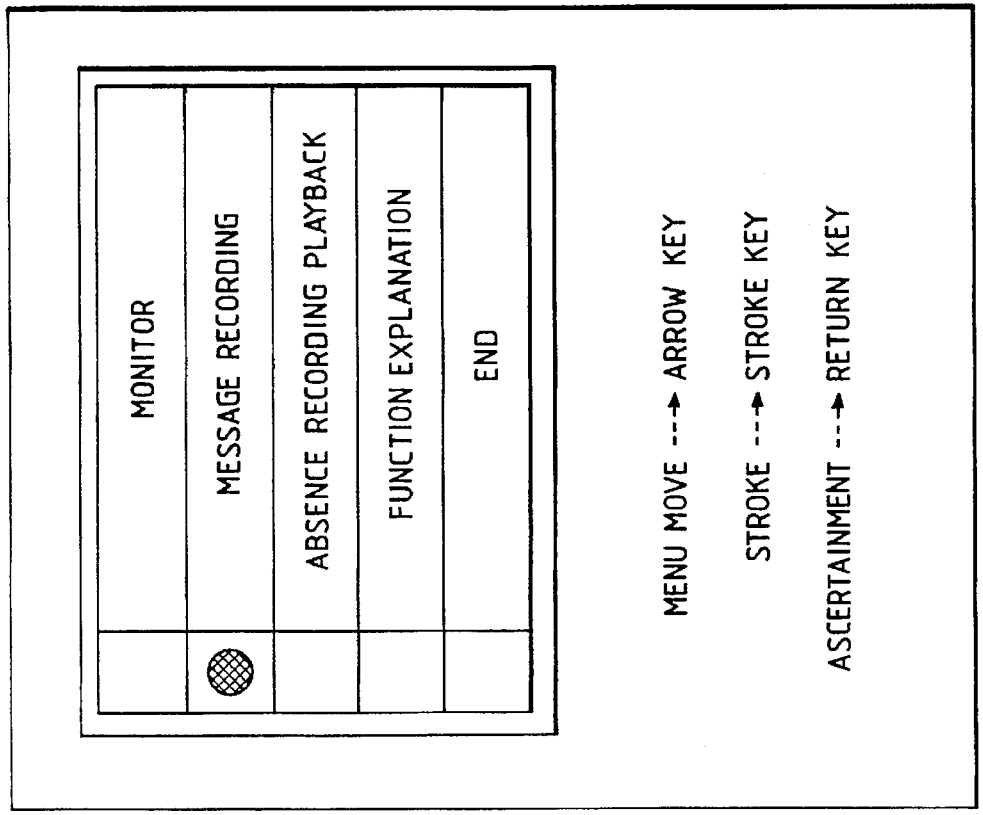

FIG. 17M shows a menu operating image, in which the menu is shown as a list and the menu selection can be varied by the arrow keys on the keyboard. Also if the menu is too long for display within an image frame, scrolling display can be employed.

Also the selection can be established by the depression of the return key.

In this manner the original functions of the keyboard are adopted without change in order to facilitate the operations.

FIG. 17N shows a monitor operating image, consisting of graphic data of the keys with assigned functions for camera control, and image data from the monitor.

In this case the operator of the partner terminal can observe the interior of the absented room, by focusing, turning, tilting and/or zooming the camera by remote control, through the newly assigned functions of the keys.

The assignment of the functions to the keys is not limited to that shown in the present embodiment.

FIG. 17O shows a message list operating image, consisting of a list of messages and a list of assignment of the keys to the functions required for message recording.

When a desired message is selected from the list of messages by the arrow keys and the stroke key and the start key "S" is depressed, there are generated and transmitted image data consisting of the image data of the message designated from the message data stored in the storage unit 15, and the graphic data of the new assignments of keys to the functions.

Also when the stop key "Q" is depressed or when a message is completed, the image as shown in FIG. 17O is transmitted again, and the message recording process is again executed.

For recording a new message, the insertion key is depressed, and the message title is entered from the keyboard.

FIG. 17P shows an operating image for the list of absence recorded messages.

In this case, there are transmitted, to the partner terminal, graphic data of the above-mentioned list and the key assignments to the functions required for reproducing the recorded messages.

The operator of the partner terminal selects a recorded message from the list by the arrow keys and the stroke key and depresses the start key "S", whereupon transmitted is a synthesized image consisting of the image data of the recorded message designated from the recorded data stored in the storage unit and the graphic data of the new key assignments to the functions.

When the stop key "Q" is depressed, or when the reproduction of the designated recorded message is completed, the image shown in FIG. 17P is transmitted to again start the reproducing process for the recorded messages.

The recorded message, which has become unnecessary after reproduction can be erased by the deletion key. Also the reproduction by index can be attained by an index reproduction key (assigned to a function key), whereby the messages are reproduced in succession.

Figure 13:
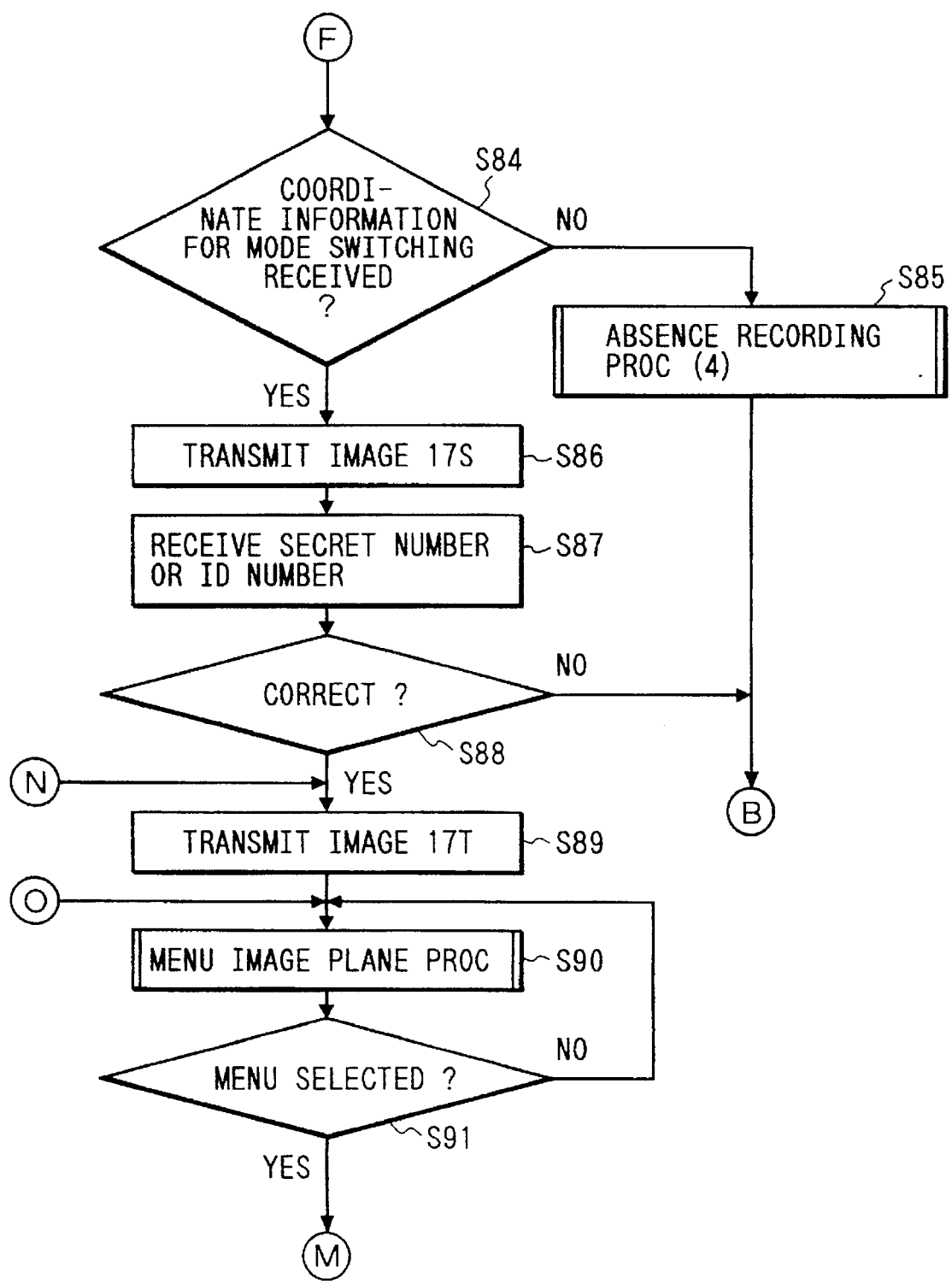
Figure 14:
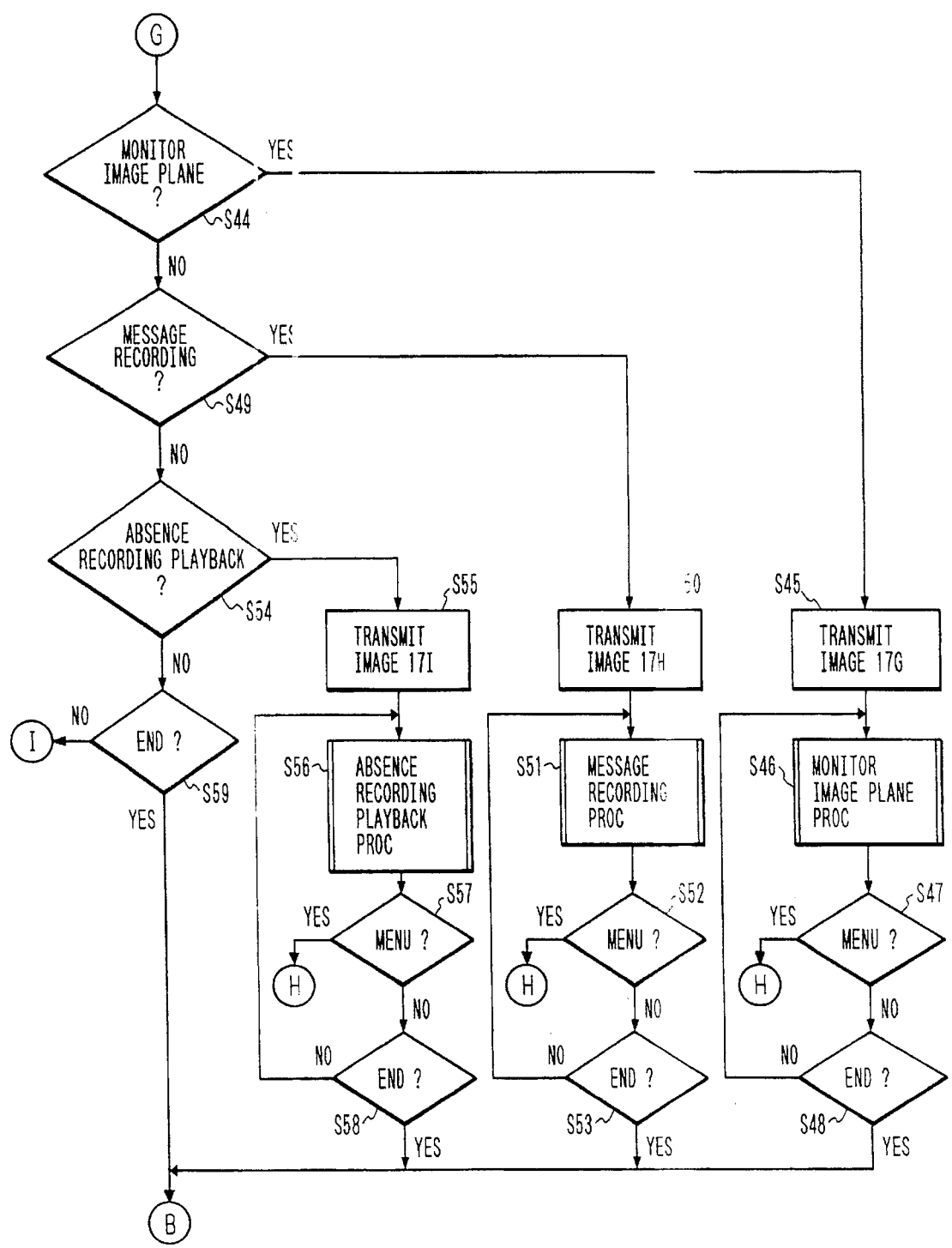
Figure 16:
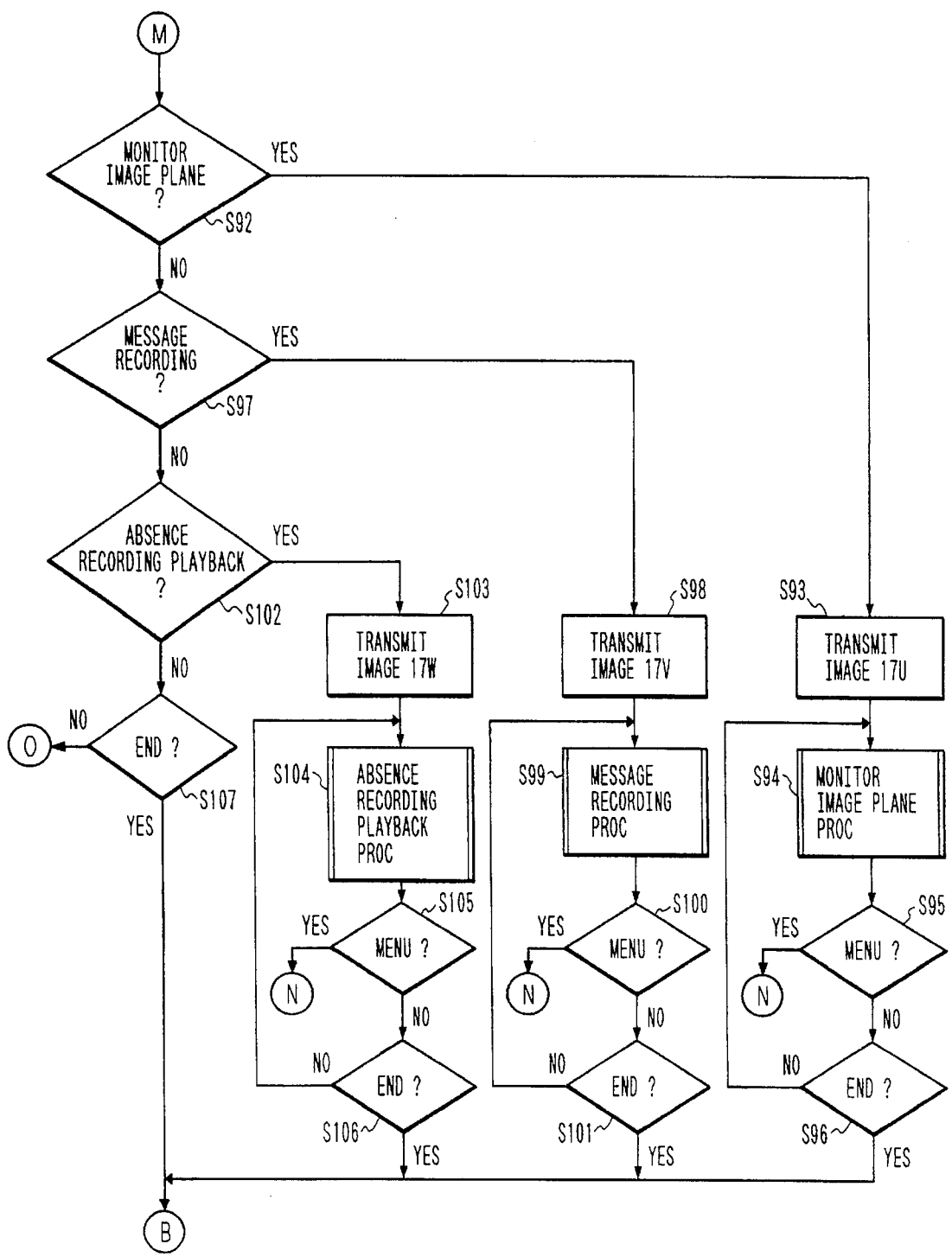

In the following there will be explained the operations by coordinate inputs, with reference to flow charts of steps S84 to S91 in FIG. 13 and steps S92 to S107 in FIG. 16.

The sequence in this case is same as that for the dial input, except for the operating images to be transmitted. In the following, therefore, explanation will be given only to such images.

Figure 17R:
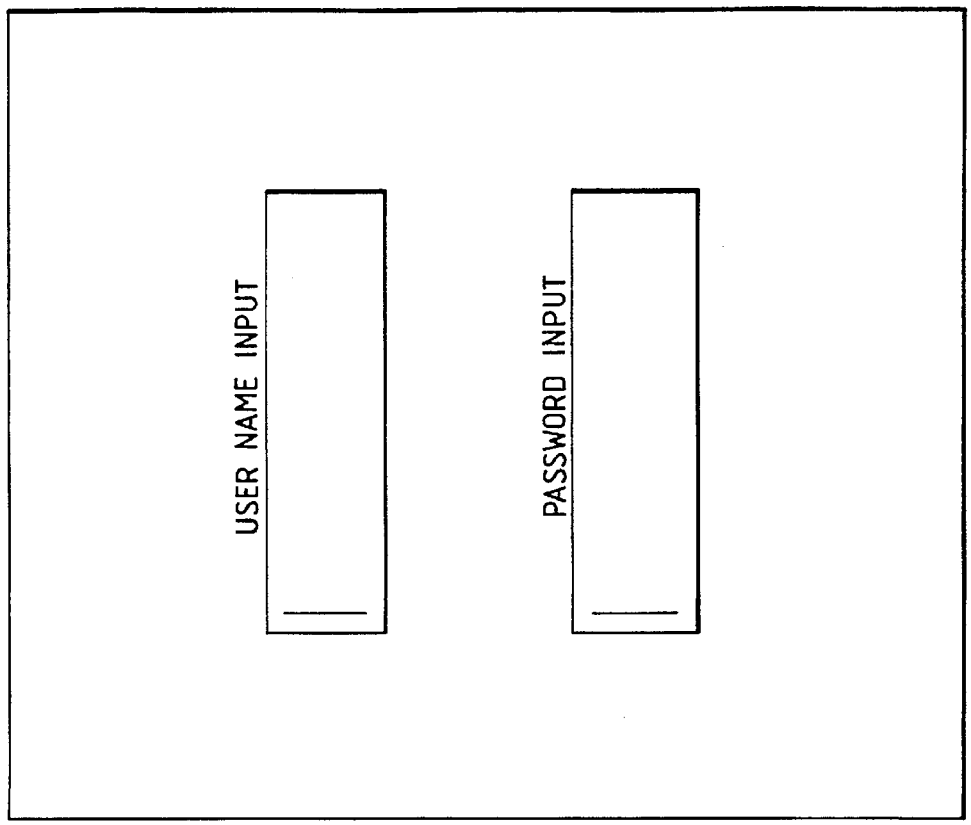
Figure 17Q:
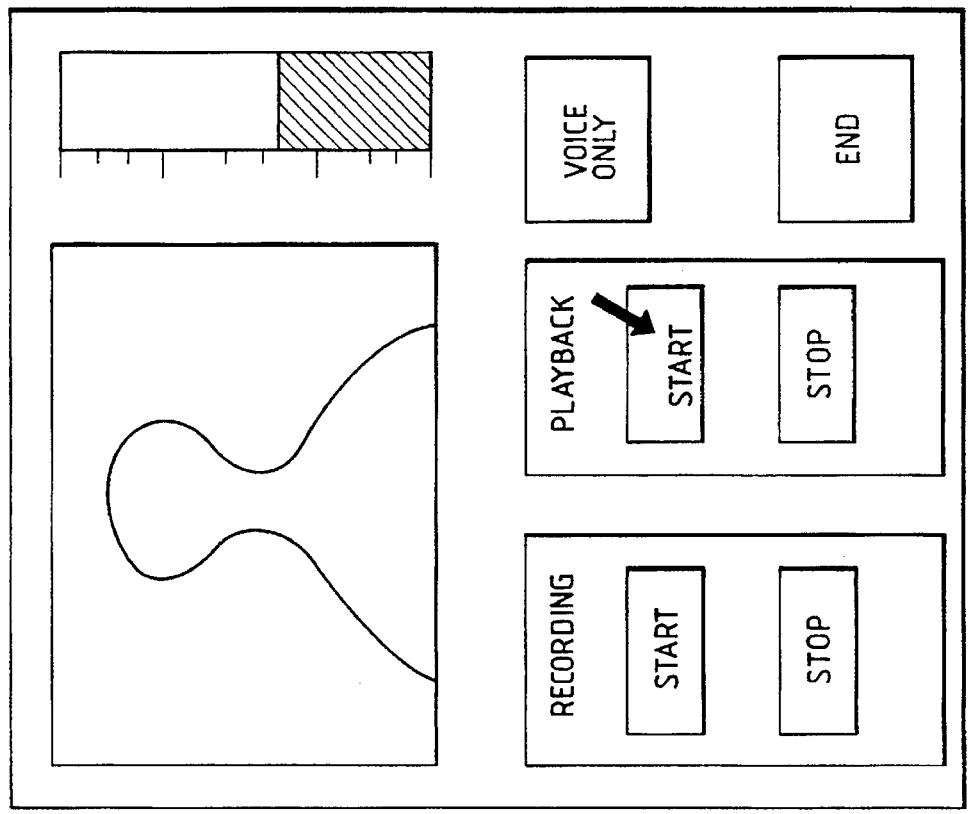

FIG. 17R shows an operating image for entering the ID number.

The user name and the password are entered by an input pen or a keyboard, and the entered information is displayed in succession in the displayed frames.

Figure 17T:
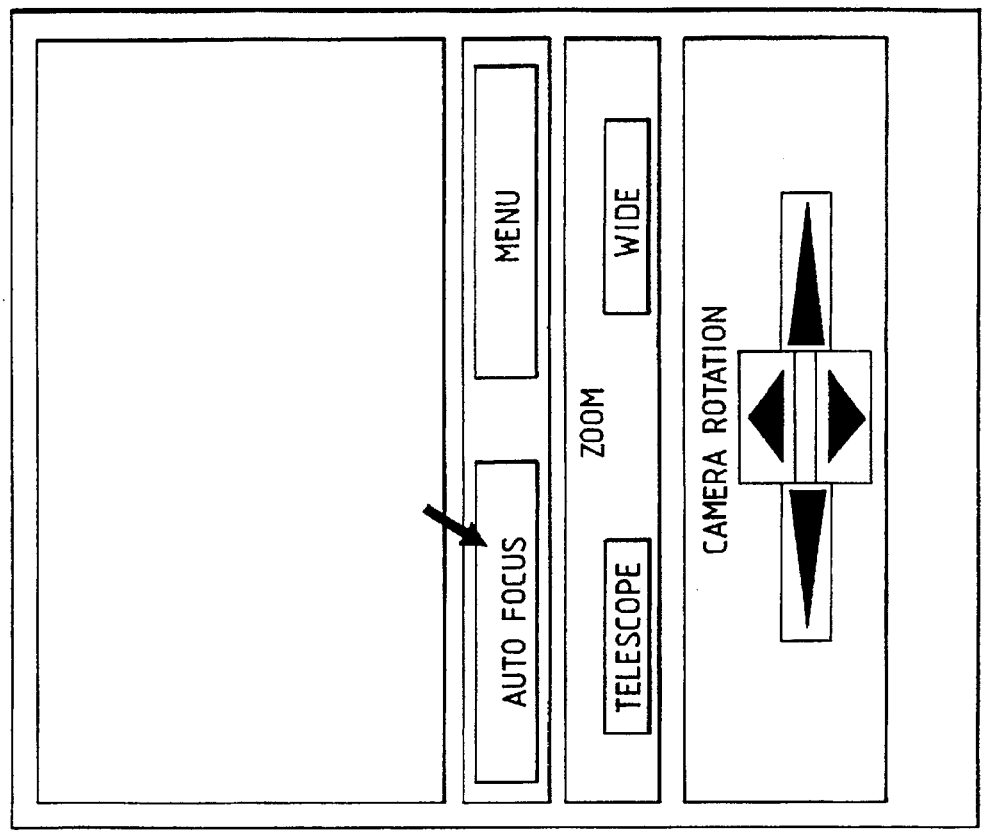
Figure 17S:
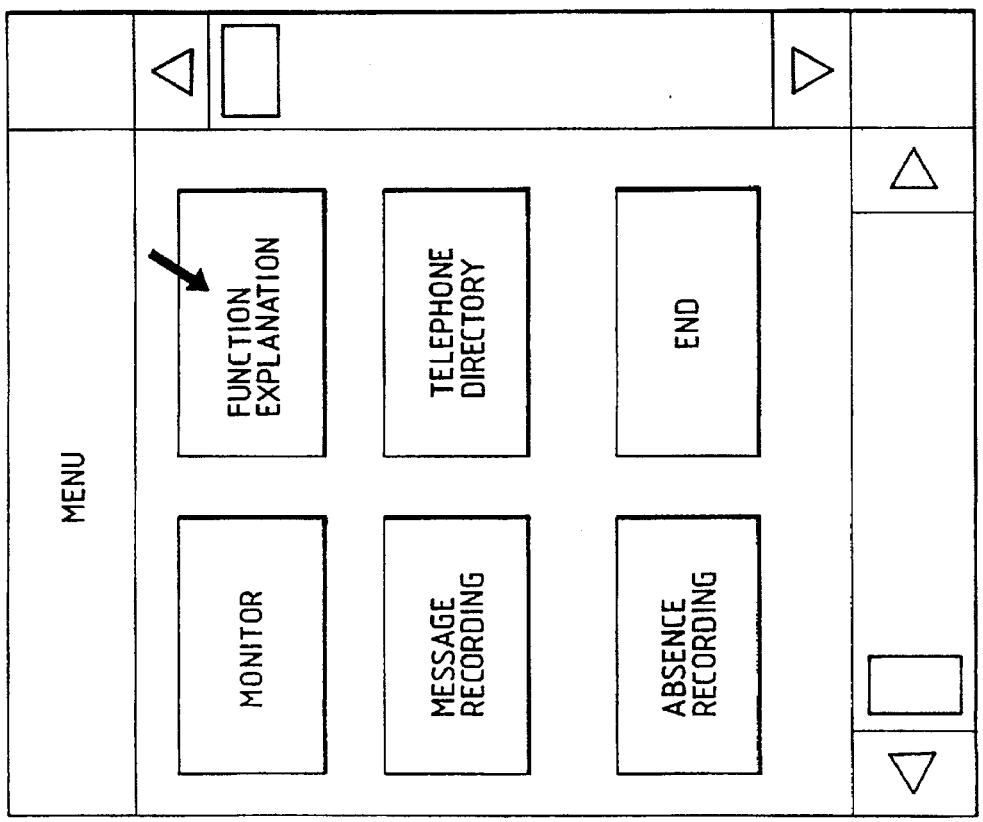

FIG. 17S shows a menu operating image.

The menu is displayed as a list, and the menu selection can be varied by a pointing arrow. If the menu is too long for display within an image frame, it is displayed with a bar for scrolling.

The menu selection is established by button clicking of the mouse, contact of the tip of the input pen, or button clicking of the input pen with button.

In this manner the original functions of the mouse or the input pen are adopted without change, in order to facilitate the operation.

FIG. 17T shows a monitor operating image, consisting of graphic data of the buttons with assignment of camera controlling functions and image data from the monitor.

The operator of the partner terminal can observe the interior of the absented room, by focusing, turning, tilting and/or zooming the camera by remote control, by selecting these buttons by the pointer. The functions are not limited to those of the present embodiment.

FIG. 17U shows a message list operating image of synthesized image data, consisting, in graphic data format, of a list of messages and menu bars assigned for the functions required for message recording.

When a desired message is selected from the list by the arrow keys and the stroke key and "recording" is selected, whereupon generated and transmitted are synthesized image data consisting of the image data of the message designated from the data stored in the storage unit 15 and the graphic data of menu bars assigned for the new functions. Also for recording a new message, a blank column is selected in the list and the message title is entered by the input pen or the mouse.

FIG. 17V shows an operating image for the list of absence recorded messages.

In this case there are transmitted, to the partner terminal, graphic data including a list of the recorded messages and menu bars assigned to the functions required for reproducing the recorded messages.

The operator of the partner terminal selects a recorded message from the list by the pointer and depresses the reproduction key, whereupon transmitted is a synthesized image consisting of the image data of a recorded message designated from the data stored in the storage unit and the graphic data of the menu bars assigned to the new functions.

As explained in the foregoing, even a function only available in this terminal can be executed by remote control from a partner terminal.

Also the image data transmitted to the partner terminal, namely the image data indicating the functions newly assigned to the operating means of the partner terminal, need not necessarily be composed of pure graphic data but can instead be composed of characters indicating the dial numbers, key names, pointer positions and the respectively assigned functions. Also the remote control need not necessarily be enabled for the owner of the terminal by the entry of the ID number, but may also be enabled, for example, when a call is received at a second telephone number registered in advance. The remote control is furthermore possible through digital lines other than the ISDN network.

In the above-explained embodiment, the graphic data are prepared with data supplied from the system control unit, but it is also possible, instead of generating the graphic data in response to the recognition of the remote control information, to store the graphic data in advance in an unrepresented memory by in-frame encoding, for example by independent encoding within a frame, also to store the image data with similar encoding in the storage unit 15 and to search said image data from the storage unit according to the remote control information, thereby sending the data immediately to the multiplex/demultiplex unit 13 in case the operation guidance is composed solely of the graphic data or in case of transmitting the image data only, thereby dispensing with the encoding unit 10. Such configuration achieves a higher processing speed.

Furthermore, even in a terminal incapable of handling text data, the search in telephone list, schedule table, document file, message memos, color still image file etc. is rendered possible since the data are transmitted in the graphic data format.

Although the above-explained embodiment has been limited to a television telephone apparatus, it will be apparent that the present invention is not limited to such television telephone but is likewise applicable to various apparatus capable of multimedia communication, such as computer communication.

As will be apparent from the embodiment explained above, the multimedia apparatus of the present invention represented for example by a television telephone apparatus enables, in case of automatic call reception in the absence mode, remote control of this apparatus from a remote partner terminal, by transmitting a guidance instruction in the voice or image form to the partner terminal or transmitting, to a television telephone terminal capable of generating DTMF tones, new functions assigned to the dial numbers, keys or pointing inputs by voice and image forms for recognition by the operator of such partner terminal, and executing operations corresponding to the input information entered by the operator of the partner terminal by the dial numbers, keys or pointing inputs mentioned above. As the functions newly assigned to the operation means of the partner terminal are transmitted visually, the operator of the partner terminal can easily recognize such newly assigned functions, so that the operability can be improved.

Besides, the functions are assigned to the operating means of the partner terminal and do not require special functions in the partner terminal, so that the apparatus can be remote controlled from any multimedia apparatus. For this reason the present invention is widely applicable and greatly improves the convenience.

Furthermore, the apparatus of the present invention can transmit graphic data even to a terminal incapable of handling text data, so that the search of telephone book, schedule table, document file, message memos, color still image file etc. can be made in the above-mentioned terminal. In this manner the function of the multimedia apparatus can be drastically improved.

What is claimed is:

1. A multimedia communication system for communication between a first communication apparatus and a second communication apparatus, wherein:
   said first communication apparatus includes:
   generation means for generating operation guidance information for operating said first communication apparatus from said second communication apparatus;
   encoding means for encoding the operation guidance information generated by said generation means; and
   transmission means for transmitting said encoded operation guidance information to said second communication apparatus; and
   said second communication apparatus includes:
   reception means for receiving said operation guidance information;
   decoding means for decoding said received operation guidance information; and
   display means for displaying said received operation guidance information on a monitor,
   wherein said generation means has a function to synthesize an image and a guidance character with each other, and generates the operation guidance information obtained by synthesizing the image and the guidance character with each other.

2. A multimedia communication system according to claim 1, wherein said first communication apparatus further includes recognition means for recognizing a data format receivable by said second communication apparatus, and said encoding means is adapted to encode said operation guidance information according to the result of recognition by said recognition means.

3. A multimedia communication system according to claim 1, wherein said second communication apparatus further includes input means for effecting a process according to said operation guidance information, and said generation means is adapted to generate operation guidance information according to the kind of said input means.

4. A multimedia communication system according to claim 1, wherein said operation guidance information is provided in plural kinds according to the function of said first communication apparatus.

5. A multimedia communication system according to claim 4, wherein said second communication apparatus is adapted to transmit control information to said first communication apparatus, according to an input from the input means in response to the operation guidance information displayed on the display means.

6. A multimedia communication system according to claim 3 or 5, wherein said input means is composed of push buttons capable of generating DTMF tones.

7. A multimedia communication system according to claim 3 or 5, wherein said input means is composed of a keyboard, a pen input unit or a mouse.

8. A multimedia communication system according to claim 1, wherein said first communication apparatus further includes identification means for confirming an identification number, and is adapted to transmit specified operation guidance information to said second communication apparatus, according to the confirmation by said identification means of an identification number transmitted from said second communication apparatus.

9. A multimedia information transmitting apparatus comprising:
   generation means for generating operation guidance information for enabling an external apparatus to operate said multimedia information transmitting apparatus;
   encoding means for encoding the operation guidance information generated by said generation means; and
   transmission means for transmitting said encoded operation guidance information to said external apparatus,
   wherein said generation means has a function to synthesize an image and a guidance character with each other, and generates the operation guidance information obtained by synthesizing the image and the guidance character with each other.

10. A multimedia information transmitting apparatus according to claim 9, further comprising recognition means for recognizing a data format receivable by said external apparatus, wherein said encoding means is adapted to encode said operation guidance information according to the result of recognition by said recognition means.

11. A multimedia transmitting apparatus according to claim 9, wherein said operation guidance information includes plural kinds of operation guidance information and the kind of operation guidance information is provided according to the function of the multimedia transmitting apparatus.

12. A multimedia information transmitting apparatus according to claim 9, further comprising identification means for confirming an identification number, wherein said multimedia information transmitting apparatus is adapted to transmit specified operation guidance information to said external apparatus according to the confirmation by said identification means of an identification number transmitted from said external apparatus.

13. A television telephone apparatus which has an image transmission/reception function with a plurality of communication partner terminals, comprising:

transmission means for transmitting an identification signal to a communication partner's television telephone apparatus; and reception means for receiving a remote control menu image of the communication partner's television telephone apparatus which remote control menu image is generated by the communication partner's television telephone apparatus, and an image by which the communication partner's terminal can be discriminated, in response to a confirmation of the identification signal by the communication partner's television telephone apparatus.

14. An apparatus according to claim 13, further comprising output means for outputting a remote control indication on the basis of the remote control menu image.

15. An apparatus according to claim 13, wherein the communication partner's television telephone apparatus has a camera, and a remote control is a camera control.

16. An apparatus according to claim 13, wherein the communication partner's television telephone apparatus has an automatic recording function, and a remote control is an automatic recording and reproducing control.

17. An apparatus according to claim 13, wherein the communication partner's television telephone apparatus has an automatic recording message transmission function, and a remote control is a registration control of an automatic recording message.

18. An apparatus according to claim 13, wherein the communication partner's television telephone apparatus has an automatic recording function, and the remote control menu image is an automatic recording list image of the communication partner's television telephone apparatus.

19. An apparatus according to claim 13, wherein the communication partner's television telephone apparatus has an automatic recording function, and automatic recording and automatic reproducing are performed according to a remote control menu in an interactive manner.

* * * * *

UNITED STATES PATENT AND TRADEMARK OFFICE
CERTIFICATE OF CORRECTION

PATENT NO. : 5,640,195  
DATED : June 17, 997  
INVENTOR(S) : Chida

Page 1 of 2

It is certified that error appears in the above-identified patent and that said Letters Patent is hereby corrected as shown below:

In the Drawings:

SHEET 5 OF THE DRAWINGS:

Fig. 5B, "Frane" should read --Frame--; and  
    Fig. 5C, "Frane" should read --Frame--.

COLUMN 1:

Line 21, ""by that" should read --in that--.

COLUMN 2:

Line 43, "attained" should read --attained,--;  
    Line 55, "sad" should read --said--; and  
    Line 63, "operation" should read --received operation--.

COLUMN 4:

Line 31, "10b" should read --10b--(bold italics).

COLUMN 5:

Line 47, "Sch" should read --Bch--; and  
    Line 62, "for" should read --form--. (2nd Occur.)

UNITED STATES PATENT AND TRADEMARK OFFICE
CERTIFICATE OF CORRECTION

PATENT NO. : 5,640,195
DATED : June 17, 1997
INVENTOR(S) : Chida

It is certified that error appears in the above-identified patent and that said Letters Patent is hereby corrected as shown below:

COLUMN 7:

Line 20, "and" should read --and the--; and
    Line 65, "frenquences" should read --frequencies--.

COLUMN 8:

Line 13, "end" should read --and--.

COLUMN 16:

Line 46, "same" should read --the same--;
        "case" should read --the case--; and
    Line 51, "are" should read --is--.

COLUMN 17:

Line 47, "same" should read --the same--.

Signed and Sealed this

Twenty-sixth Day of May, 1998

Attest:

BRUCE LEHMAN

*Attesting Officer*     *Commissioner of Patents and Trademarks*